(12) United States Patent
Okada et al.

(10) Patent No.: US 7,873,865 B2
(45) Date of Patent: Jan. 18, 2011

(54) APPARATUS AND METHOD FOR CONTROLLING DATA RECOVERY

(75) Inventors: Wataru Okada, Yokohama (JP); Masayuki Yamamoto, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 395 days.

(21) Appl. No.: 11/971,307

(22) Filed: Jan. 9, 2008

(65) Prior Publication Data
US 2008/0178185 A1    Jul. 24, 2008

(30) Foreign Application Priority Data
Jan. 24, 2007    (JP) .............................. 2007-013743

(51) Int. Cl.
*G06F 11/00*    (2006.01)
(52) U.S. Cl. .............................. 714/6; 714/20; 714/54
(58) Field of Classification Search ...................... 714/6, 714/15, 16, 20, 54
See application file for complete search history.

(56) References Cited

U.S. PATENT DOCUMENTS

| | | | | |
|---|---|---|---|---|
| 6,880,051 | B2 * | 4/2005 | Timpanaro-Perrotta | 711/162 |
| 7,222,194 | B2 * | 5/2007 | Kano et al. | 709/248 |
| 7,234,077 | B2 * | 6/2007 | Curran et al. | 714/15 |
| 7,325,161 | B1 * | 1/2008 | Rakic et al. | 714/15 |
| 7,340,646 | B2 * | 3/2008 | Haustein et al. | 714/20 |
| 7,536,591 | B2 * | 5/2009 | Varadarajan et al. | 714/15 |
| 7,577,690 | B2 * | 8/2009 | Chandrasekaran et al. | 1/1 |
| 7,669,081 | B2 * | 2/2010 | Lett et al. | 714/20 |
| 2003/0070114 | A1 * | 4/2003 | Yasuda | 714/20 |
| 2003/0135650 | A1 * | 7/2003 | Kano et al. | 709/248 |
| 2004/0193945 | A1 * | 9/2004 | Eguchi et al. | 714/6 |
| 2005/0154829 | A1 * | 7/2005 | Maki et al. | 711/114 |
| 2007/0136389 | A1 * | 6/2007 | Bergant et al. | 707/201 |
| 2008/0126847 | A1 * | 5/2008 | Koarashi | 714/6 |

FOREIGN PATENT DOCUMENTS

| | | |
|---|---|---|
| JP | 2004-252686 | 9/2004 |
| JP | 2005-196618 | 7/2005 |

OTHER PUBLICATIONS

Wikipedia, "Continuous data protection", website http://en.wikipedia.org/wiki/Continuous_data_protection archived Sep. 13, 2006, accessed Mar. 26, 2010.*
Matthew Hart and Scott Jesse, "Tuning Your Database for Availability", 2004, McGraw-Hill/Osborne.*

* cited by examiner

*Primary Examiner*—Joshua A Lohn
(74) *Attorney, Agent, or Firm*—Antonelli, Terry, Stout & Kraus, LLP.

(57) ABSTRACT

A control apparatus comprises a priority determination unit for determining the priority of each of a plurality of applications that use data in different logical volumes constituting a volume group, and a restoration instruction unit for issuing a restoration instruction to a storage system to execute restoration on the plurality of logical volumes constituting the volume group in sequence from a logical volume used by an application having a high priority.

10 Claims, 20 Drawing Sheets

FIG. 2

JNLG MANAGEMENT TABLE

| AP_ID | JNLG_ID | AP MANAGEMENT NETWORK ADDRESS |
|---|---|---|
| DB1 | JNLG_1 | 192.168.0.10 |
| DB2 | JNLG_1 | 192.168.0.13 |
| EXT3-3 | JNLG_1 | 192.168.0.12 |
| DB4 | JNLG_2 | 192.168.1.10 |
| ... | ... | ... |

FIG. 3

VOLUME MANAGEMENT TABLE

| AP_ID | DATA VOLUME ID | STORAGE MANAGEMENT NETWORK ADDRESS |
|---|---|---|
| DB1 | LU_10 | 192.168.10.10 |
| DB1 | LU_11 | 192.168.10.10 |
| DB1 | LU_12 | 192.168.10.10 |
| DB2 | LU_20 | 192.168.10.10 |
| ... | ... | ... |

FIG. 4

MONITOR MANAGEMENT TABLE

| JNLG_ID | MONITOR INTERVAL |
|---|---|
| JNG_1 | 60sec |
| JNG_2 | 60sec |
| ... | ... |

MARKER MANAGEMENT TABLE

| TIME | SEQUENCE NUMBER | DATA |
|---|---|---|
| 2006/11/12 10:10 | 1001 | STATICIZATION POINT |
| 2006/11/12 10:20 | 1040 | CONSISTENCY CHECK TIME (DB1:100Sec, DB2:150Sec, FS3:0Sec) |
| ... | ... | ... |

JOURNAL MANAGEMENT TABLE

| TIME 6001 | SEQUENCE NUMBER 6002 | APPLICATION DESTINATION VOLUME 6003 | APPLICATION DESTINATION ADDRESS 6004 | STORAGE VOLUME 6005 | STORAGE ADDRESS 6006 | DATA LENGTH 6007 |
|---|---|---|---|---|---|---|
| 2006/11/12 10:10 | 1001 | LU_1 | 4023 | J_LU_1 | 10023 | 1M |
| 2006/11/12 10:20 | 1040 | LU_1 | 4003 | J_LU_1 | 12003 | 1M |
| ... | ... | ... | ... | ... | ... | ... |

1031

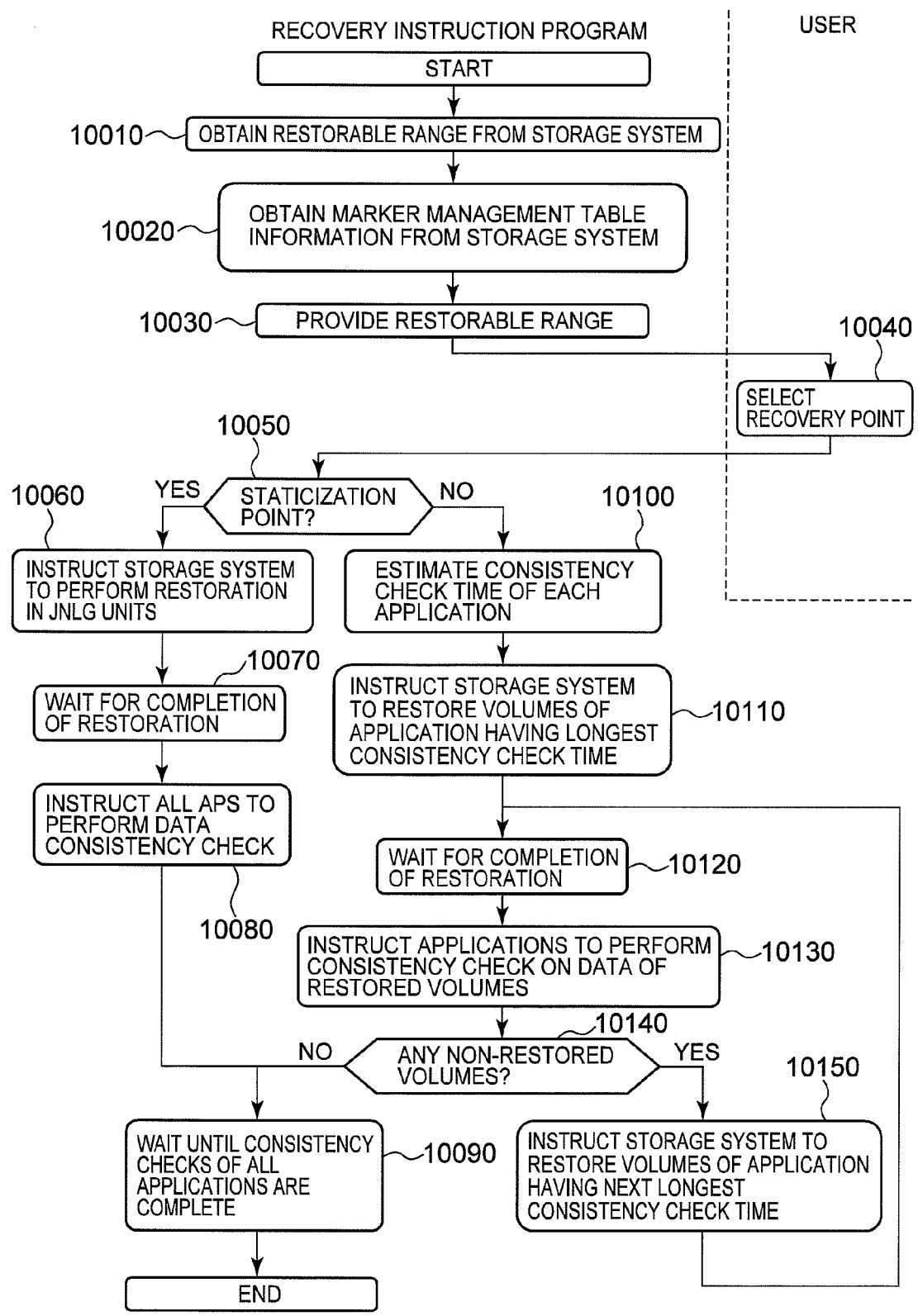

FIG. 13

WORKFLOW FILE

| EXECUTION SEQUENCE | AP_ID | COMMAND | AP MANAGEMENT NETWORK ADDRESS | OPERATIONAL STATE |
|---|---|---|---|---|
| 1 | AP1 | Commnad1 | 192.168.0.10 | OPERATIONAL |
| 2 | AP2 | Commnad2 | 192.168.0.13 | OPERATIONAL |
| 3 | AP3 | Commnad3 | 192.168.0.12 | OPERATIONAL |
| 4 | AP4 | Commnad4 | 192.168.1.10 | OPERATIONAL |
| ... | ... | ... | ... | ... |

WORKFLOW MANAGEMENT TABLE

| WORKFLOW ID | START TIME | PROGRESS STATE |
|---|---|---|
| 1 | 2006/11/16 10:11:12 | DONE |
| 2 | 2006/11/16 10:12:12 | 3 |
| 3 | 2006/11/17 10:11:12 | WAIT |
| 4 | 2006/11/17 10:12:12 | WAIT |
| ... | ... | ... |

JNLG MANAGEMENT TABLE

| AP_ID | JNLG_ID | AP MANAGEMENT NETWORK ADDRESS | STATUS |
|---|---|---|---|
| AP1 | JNLG_1 | 192.168.0.10 | OPERATIONAL |
| AP2 | JNLG_1 | 192.168.0.13 | OPERATIONAL |
| AP3 | JNLG_1 | 192.168.0.12 | OPERATIONAL |
| AP4 | JNLG_2 | 192.168.1.10 | OPERATIONAL |
| ... | ... | ... | ... |

FIG. 20

COPY GROUP MANAGEMENT TABLE

| 20001 | 20002 | 20003 | 20004 |
|---|---|---|---|
| AP_ID | CG_ID | AP MANAGEMENT NETWORK ADDRESS | STATUS |
| AP1 | CG_1 | 192.168.0.10 | OPERATIONAL |
| AP2 | CG_1 | 192.168.0.13 | OPERATIONAL |
| AP3 | CG_1 | 192.168.0.12 | OPERATIONAL |
| AP4 | CG_2 | 192.168.1.10 | OPERATIONAL |
| ... | ... | ... | ... |

BACKUP MANAGEMENT TABLE

| 21001 | 21002 | 21003 |
|---|---|---|
| CG_ID | ACQUISITION TIME | PROGRESS STATE |
| CG_1 | 2006/11/16 10:11:12 | WORKFLOW ID: 2, PROGRESS STATE: 2 |
| CG_2 | 2006/11/16 10:12:12 | WORKFLOW ID: 4, PROGRESS STATE: 1 |
| CG_1 | 2006/11/17 10:11:12 | WORKFLOW ID: 2, PROGRESS STATE: 2 |
| CG_2 | 2006/11/17 10:12:12 | WORKFLOW ID: 4, PROGRESS STATE: 1 |
| ... | ... | ... |

SNAPSHOT VOLUME MANAGEMENT TABLE

| SSVOL GROUP ID | SNAPSHOT VOLUME ID | ID OF CORRESPONDING DATA VOLUME |
|---|---|---|
| SSG_1 | LU_21 | LU_11 |
| SSG_1 | LU_22 | LU_12 |
| SSG_1 | LU_23 | LU_13 |
| SSG_2 | LU_24 | LU_11 |
| ... | ... | |

SSVOL GROUP MANAGEMENT TABLE

| JNLG_ID | SSVOL GROUP ID | SEQUENCE NUMBER | ACQUISITION TIME |
|---|---|---|---|
| JNLG_1 | SSG_1 | 100 | 2005/06/01 10:00 |
| JNLG_1 | SSG_2 | 105 | 2005/06/01 11:00 |
| JNLG_1 | SSG_3 | 110 | 2005/06/01 12:00 |
| JNLG_2 | SSG_4 | 100 | 2005/06/01 10:00 |
| ... | ... | | |

25000

APPARATUS AND METHOD FOR CONTROLLING DATA RECOVERY

CROSS-REFERENCE TO PRIOR APPLICATION

This application relates to and claims the benefit of priority from Japanese Patent Application number 2007-013743, filed on Jan. 24, 2007, the entire disclosure of which is incorporated herein by reference.

BACKGROUND

The present invention relates to data recovery.

Typically, in a computer system, measures are taken to ensure that data backup and recovery can be performed periodically in preparation for cases where data are lost due to a fault in the storage system, data corruption caused by a computer virus, an operational error performed by a user, and so on.

Furthermore, to utilize business enterprise management resources effectively and increase management efficiency, many business enterprises are currently constructing computer systems in which applications (database management systems (DBMS), file systems, and so on) that were originally run independently in the department of each basic operation are integrated using an ERP package (Enterprise Resource Planning package) or the like such that the applications can be operated in conjunction. More specifically, for example, information is shared by having the respective applications run in each department use the same storage system. In addition, by having the applications use each other's functions and processing results, efficient processing can be performed throughout the entire computer system. When the applications operate using each other's functions and processing results in this manner, the applications operate in conjunction.

When a fault occurs in a computer system having a plurality of applications that operate in conjunction, recovery must be performed while maintaining the consistency of the applications (the consistency of the data used by the applications).

A technique in which a backup operation is performed collectively on a storage area (data volume) used by various applications has been proposed as a backup technique for realizing this type of recovery (see Japanese Patent Application Publication 2005-196618, for example). In Japanese Patent Application Publication 2005-196618, it is disclosed that a storage system stores a data volume group (referred to as a "copy group") on which the collective backup operation is to be performed, and that in response to a copy group-unit backup operation, the storage system backs up the data of the same point in time in all of the data volumes belonging to the copy group.

When recovery is performed using this backup technique, the data volumes belonging to the copy group are recovered to their condition at the same point in time, and therefore consistency between the applications is guaranteed.

A backup technique using journaling has been proposed as another technique (see Japanese Patent Application Publication 2004-252686, for example). In Japanese Patent Application Publication 2004-252686, it is disclosed that a snapshot (a logical image of a full backup, an incremental backup, or the like) of a logical group (to be referred to as "journal group" hereafter) constituted by one or more data volumes at a specific point in time is obtained, data written to the data volumes thereafter are stored as a journal (referred to as an "after journal") in a journal volume associated with the journal group, and by applying a series of after journals in a sequence written in relation to the obtained snapshot, the data in all of the data volumes belonging to the journal group are restored to their condition at a specific point in time. This is an example of a technique usually known as "Continuous Data Protection" or by its abbreviation, "CDP".

The data restored in this manner are completely restored to the same point in time, and by using this technique to perform recovery, the consistency between applications can be guaranteed.

Note that the snapshot serving as the object of journal application during recovery is known as a "base snapshot".

To describe the problems with this technique, first the term "recovery" will be defined.

In a "recovery", the following two processes are executed in sequence.

Firstly, the storage system or backup software performs processing to restore data at the backup time to a data volume. Hereafter, this process will be referred to simply as "restoration". In relation to the technique of Japanese Patent Application Publication 2005-196618, for example, restoration specifically involves restoring the data in a data volume on the basis of a backup volume in the storage system. In relation to Japanese Patent Application Publication 2004-252686, for example, restoration involves restoring the data in a data volume on the basis of the base snapshot to data at the point in time when the base snapshot was captured, applying a journal to the data volume, and reconstructing data of a specific point in time.

Secondly, an application performs processing to check and modify the content of the restored data before resuming operations to ensure that the restored data are consistent with the application. Hereafter, this process will be referred to as a "consistency check". When the application is a file system, the consistency check specifically involves processing (an FSCK (File System Consistency Check) or the like) to mount the volume and perform a data consistency check. When the application is a DBMS, the consistency check involves processing (processing known as crash recovery, instant recovery, or the like) to apply a log to the restored data and then cancel updates up to the time of the latest commit.

Returning to the problems of this technique, requests are typically made in relation to computer system recovery for reductions in the time needed for recovery (the recovery time) and increases in the speed with which operations can be resumed.

Further, there is a limit to the throughput of restoration processing. This limit has various causes such as a bottleneck in the performance of the CPU that controls the restoration processing, a bottleneck in the network or bus area during data transfer, and a bottleneck in access to a logical volume such as a data volume. Hence, when a plurality of volumes are restored in group units, the throughput is dispersed, causing an increase in the restoration processing time of each volume.

When performing recovery on a computer system in which a plurality of applications operate in conjunction and the restoration processing time of each volume increases as described above, the start timing of the consistency check of each application is delayed. As a result, the recovery time of each application increases, leading to an increase in the time required to resume the operations of a computer system in which a plurality of applications operate in conjunction.

Note that here, the meaning of the term "the time required to resume the operations of a computer system in which a plurality of applications operate in conjunction" differs according to the manner in which the applications cooperate. In a computer system in which close cooperation is performed such that the plurality of applications access each other's processing (functions and the like), the term signifies the time until the recovery of all applications is complete. Meanwhile, in a computer system in which a plurality of applications cooperate loosely, such as a work flow in which the results of processing performed independently by a single application are used by another application, the term signifies the time until the recovery of the application that will execute the processing to be performed immediately after the resumption of operations is complete. Further, when performing recovery, the user sometimes specifies the point in time to which the data are to be restored. The term "recovery point" is used to indicate the specified point in time. The recovery point may be specified by a method other than user specification.

The problems described above may also occur in a computer system in which a plurality of applications do not operate in conjunction, as well as a computer system in which a plurality of applications operate in conjunction.

SUMMARY

An object of the present invention is to reduce the time required to resume the operations of a computer system in which a plurality of applications operate.

Other objects of the present invention will become clear from the following description.

A control apparatus according to the present invention controls the recovery of data stored in a plurality of logical volumes constituting a volume group within a storage system having the plurality of logical volumes, and comprises a priority determination unit for determining the priority of each of a plurality of applications that use the data in the different logical volumes constituting the volume group, and a restoration instruction unit for issuing a restoration instruction to the storage system to execute restoration on the plurality of logical volumes constituting the volume group in sequence from a logical volume used by an application having a high priority.

Each of the units described above may be constructed from hardware, a computer program, or a combination thereof (for example, a part of the unit may be realized by a computer program, and the remainder may be realized by hardware). A computer program is executed upon being read by a predetermined processor. Further, a storage area existing on a hardware resource such as memory may be used appropriately during information processing performed when the computer program is read by the processor. The computer program may also be installed on a computer from a recording medium such as a CD-ROM, or downloaded onto the computer via a communication network.

Further, the control apparatus may be incorporated into the interior of the storage system, or the control apparatus and storage system may be connected via a communication network.

Further, the control apparatus may be constituted by a host computer on which the plurality of applications are executed and a management computer for issuing instructions to the host computer. Alternatively, the control apparatus may be a host computer on which the plurality of applications are executed or a management computer for issuing instructions to the host computer. For example, when the control apparatus is constituted by a host computer and a management computer, the host computer, management computer, and storage system may be connected via a communication network.

BRIEF DESCRIPTION OF THE DRAWINGS

FIG. 2 is a view showing an example of a JNLG management table in the first embodiment;

FIG. 3 is a view showing an example of a volume management table in the first embodiment;

FIG. 4 is a view showing an example of a monitor management table in the first embodiment;

FIG. 5 is a view showing an example of a marker management table in the first embodiment;

FIG. 6 is a view showing an example of a journal management table in the first embodiment;

FIG. 10 is a view showing the processing flow of a recovery instruction program in the first embodiment;

FIG. 13 is a view showing an example of a workflow of the second embodiment;

FIG. 14 is a view showing an example of a workflow management table in the second embodiment;

FIG. 15 is a view showing an example of a JNLG management table in the second embodiment;

FIG. 20 is a view showing an example of copy group management table in the third embodiment;

FIG. 21 is a view showing an example of a backup management table in the third embodiment;

FIG. 24 is a view showing an example of a snapshot volume management table; and

FIG. 25 is a view showing an example of an SSVOL group management table

DETAILED DESCRIPTION OF THE PREFERRED EMBODIMENTS

Several embodiments of the present invention will be described below with reference to the drawings. Note that the present invention is not limited by these embodiments.

First Embodiment

First, a first embodiment will be described.

A computer system according to this embodiment comprises a storage system that performs backup and restoration using a backup technique employing journaling. The storage system comprises volumes storing the data of a plurality of closely cooperating applications, and backs up (and restores) these data using a backup technique employing journaling.

In this computer system, the plurality of applications access each other's processing. Hence, when a fault such as data corruption occurs, operations can only be resumed when all of the applications have been recovered.

When a backup technique employing journaling is used to restore data to their condition at an arbitrary point in time, the data are inconsistent with a typical application, and therefore, consistency check processing (FSCK or crash recovery, for example) is required. However, the time required for this processing varies greatly according to the application type and the operational state of the application at the recovery point.

Incidentally, when all of the volumes are restored collectively, the time required to complete restoration increases for all of the volumes. As a result, the consistency check start time is delayed in all of the applications, and the time required to resume operations lengthens.

In this embodiment, to solve this problem, the data of an application in which a restored data consistency check takes a long time are restored preferentially such that restoration is completed earlier than the other applications. Thus, consistency check processing can be executed earlier when the time required for the processing is long. Further, since the consistency check processing is performed on a host computer and does not affect the restoration processing performance of the storage system, the data of the other applications can be restored in parallel with the processing. As a result, the time required to resume operations can be shortened.

The system configuration and operations of this embodiment will now be described.

(1) System Configuration of First Embodiment

Figure 1:
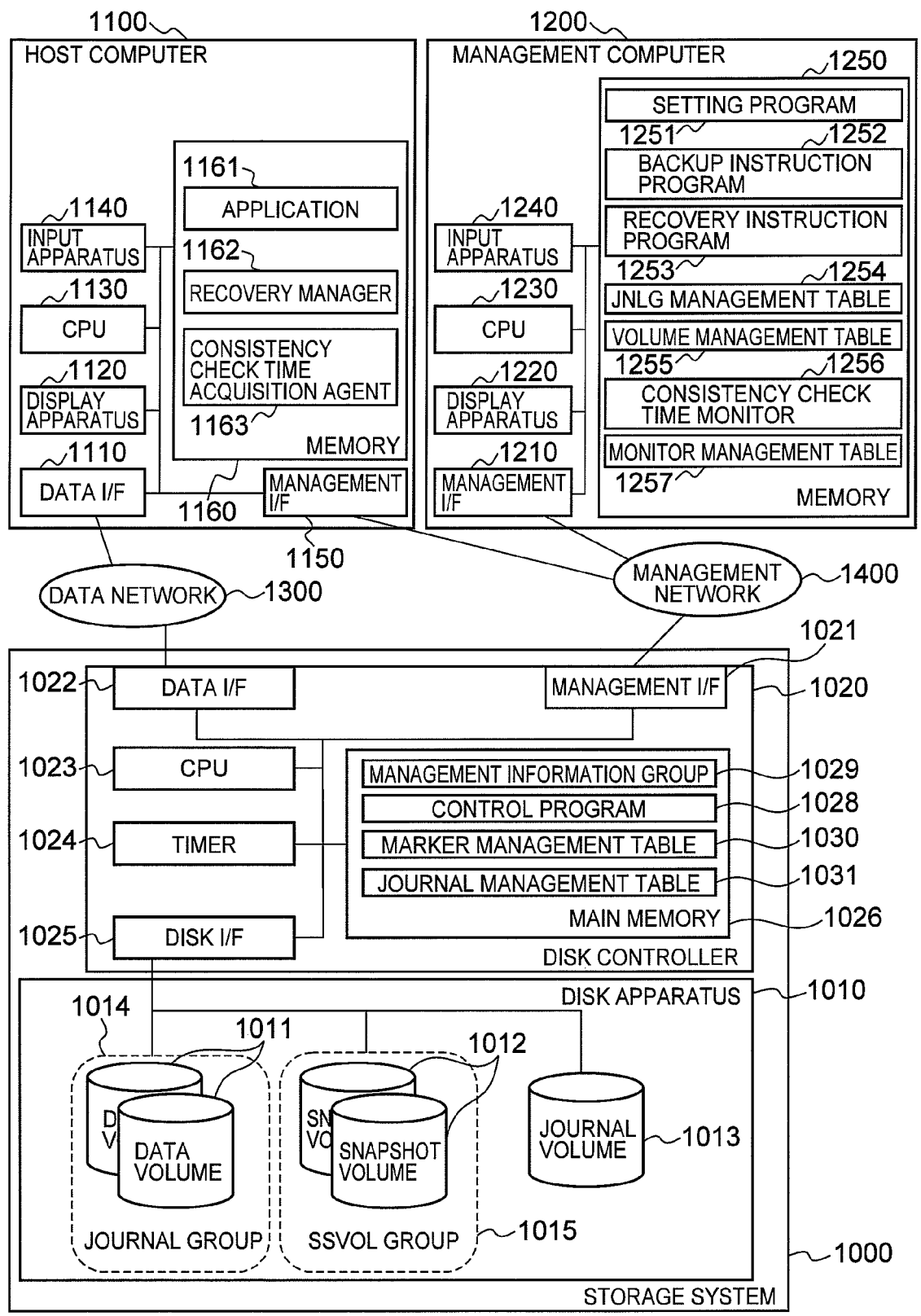
FIG. 1 is a view showing the system configuration of a first embodiment.

FIG. 1 is a block diagram showing the configuration of a computer system according to this embodiment. In this system, a storage system 1000 and a host computer 1100 are connected to each other via a data network 1300. In this embodiment, the data network 1300 is a storage area network, but may be an IP network or another data communications network.

The storage system 1000, the host computer 1100, and a management computer 1200 are connected to each other via a management network 1400. In this embodiment, the management network 1400 is an IP network, but may be a storage area network or another data communications network. Further, the data network 1300 and management network 1400 may be the same network, and the host computer 1100 and management computer 1200 may be the same computer.

Note that for ease of description, FIG. 1 shows a single storage system 1000, a single host computer 1100, and a single management computer 1200, but more than one of each of these computers may be provided.

The storage system 1000 is constituted by a disk apparatus 1010 for storing data, and a disk controller 1020 for performing control of the interior of the storage system 1000.

The disk apparatus 1010 is a disk-form storage apparatus such as a hard disk drive, for example. Instead of the disk apparatus 1010, numerous types of storage apparatus, such as a flash memory device and so on, may be employed. A plurality of logical volumes, for example data volumes 1011, snapshot volumes 1012, journal volumes 1013, and so on, are formed on the basis of the storage space of the disk apparatus 1010. A journal group 1014 and an SSVOL group 1015 are respectively formed by one or more logical volumes from among the plurality of logical volumes. Note that in actuality, the storage system 1000 comprises a plurality of disk apparatuses 1010, and logical volumes are formed on the basis of the storage spaces of the plurality of disk apparatuses 1010. The disk apparatus 1010 may be provided singly or in plural.

The journal group 1014 is constituted by one or more data volumes 1011. Each data volume 1011 is a logical volume storing data that are used by the host computer 1100. Further, one or more journal volumes 1013 and one or more SSVOL groups 1015 are associated with the journal group 1014.

Each journal volume 1013 is a logical volume storing a journal.

The SSVOL group 1015 is constituted by one or more snapshot volumes 1012. Each snapshot volume 1012 is a logical volume storing a duplicated image (snapshot) of the data volumes 1011 at a certain point in time. Note that the snapshot stored in the snap shot volume 1012 may be a full backup of the data volumes 1011 or a logical image such as an incremental backup.

Note that information (configuration information) relating to these logical volumes is managed in a management information group 1029 by a CPU 1023 that executes a control program 1028 to be described below.

The disk controller 1020 comprises a management I/F 1021, a data I/F 1022, a disk I/F 1025, a main memory 1026, a CPU 1023, and a timer 1024.

The main memory 1026 stores the management information group 1029, the control program 1028, a marker management table 1030, and a journal management table 1031. The CPU 1023 executes the programs stored in the main memory 1026.

When the control program 1028 is executed by the CPU 1023, processing required to realize the backup technique employing journaling, such as snapshot acquisition, journal creation, restoration employing journaling, and journal opening, is performed. Hereafter, when a computer program is the subject of a sentence, it is assumed that in actuality, processing is performed by the CPU that executes the computer program.

The control program 1028 generates and manages markers for assisting recovery using the backup technique employing journaling. A marker is data including text data. The markers are managed in association with a journal creation sequence. Hence, the markers can be used as an index for selecting a recovery point during recovery.

The control program 1028 is also capable of performing processing to input and output data to and from the disk apparatus 010 in accordance with a request from the management computer 1200 or host computer 1100, and setting internal configuration information of the storage system 1000 (the logical volume configuration and so on) and control information. For example, setting the configuration of the storage system 1000 involves setting information indicating the logical volume classification, i.e. determining which logical volumes are the data volumes 1011 and so on, and setting information indicating inter-volume relationships, i.e. determining the journal groups to which the data volumes 1011 belong and so on. The information expressing these configuration settings is included in the management information group 1029 as all or a part of the configuration information. The control program 1028 is capable of executing the various processes described above while referencing or updating the information in the management information group 1029.

Operations required for describing this embodiment, from among the operations of the control program 1028 relating to the backup technique employing journaling, will now be described in sequence.

The control program 1028 manages the sequence in which the snapshots, journals, and markers are created. In so doing, it is possible to specify the sequence in which each journal is applied to each snapshot during data restoration.

Specific examples of methods for managing and using the creation sequence are as follows.

First, the control program 1028 manages a sequence number for each journal group 1014 in order to manage the creation sequence.

Then, upon reception of writing from the host computer 1100 to the data volume 1011, the control program 1028 performs writing to the corresponding data volume 1011. At this time, the control program 1028 sets the write data as a journal, and allocates the sequence number of the journal group 1014 to which the data volume 1011 belongs to the journal. The control program 1028 then stores the journal in the journal volume 1013 that is associated with the journal group 1014 to which the data volume 1011 belongs. The control program 1028 then adds 1 to the sequence number of the corresponding journal group 1014.

Further, upon reception of a marker creation request from a recovery manager 1162 or a backup instruction program 1252, to be described below, the control program 1028 creates a marker and allocates the sequence number of the journal group 1014 to which the corresponding data volume 1011 belongs to the marker. The control program 1028 then stores the marker in a marker management table 1030 (to be described below) associated with the journal group 1014 to which the data volume 1011 belongs. The control program 1028 then adds 1 to the sequence number of the corresponding journal group 1014.

Further, upon reception of a snapshot acquisition request from the recovery manager 1162 or backup instruction program 1252, to be described below, the control program 1028 stores a snapshot of the data volumes 1011 belonging to the specified journal group 1014 in the snapshot volume 1012 belonging to the SSVOL group 1015 that is associated with the journal group 1014. Next, the control program 1028 allocates the sequence number of the journal group 1014 to the snapshot. The control program 1028 then adds 1 to the sequence number of the corresponding journal group 1014.

By having the control program 1028 perform the processing described above, the creation sequence of the snapshots, journals, and markers is managed.

The creation sequence is used during restoration by the control program 1028. The control program 1028 uses the creation sequence to specify the journal to be applied to the base snapshot and the application sequence thereof. More specifically, when restoration is performed by applying a journal to a specific snapshot (serving as the base snapshot), the control program 1028 applies a journal having a sequence number that is larger than that of the snapshot and equal to or lower than that of the journal at the specified recovery point in accordance with the sequence number. When a marker is specified as the recovery point, the control program 1028 applies a journal having a sequence number that is larger than that of the base snapshot and smaller than that of the marker at the specified recovery point in accordance with the sequence number. Restoration is performed by having the control program 1028 perform the processing described above.

The management information group 1029 is information for executing the various functions of backup employing journaling, and includes information indicating the classification of the logical volumes, i.e. determining which logical volumes are the data volumes 1011, which logical volumes are the snapshot volumes 1012, and so on, and information indicating the inter-volume relationships, i.e. the journal group 1014 to which each data volume 1011 belongs and so on, as described above.

The marker management table 1030 and journal management table 1031 will be described below.

The timer 1024 is a typical timer having a function for providing the current time. The timer is referred to by the control program 1028 when creating a journal or obtaining a snapshot.

The data I/F 1022 is an interface with the data network 1300, and has one or more communication ports. The disk controller 1020 transmits and receives data and control commands to and from the host computer 1100 and another storage system 1000 via this port. The management I/F 1021 is an interface with the management network 1400 for transmitting and receiving data and control commands to and from the host computer 1100 and management computer 1200. The disk I/F 1025 is an interface with the disk apparatus 1010 for transmitting and receiving data and control commands.

The host computer 1100 comprises an input apparatus 1140 such as a keyboard or a mouse, a CPU 1130, a display apparatus 1120 such as a CRT, a memory 1160, a data I/F 1110, and a management I/F 1150.

The data I/F 1110 is an interface with the data network 1300, and has one or more communication ports. The host computer 1100 transmits and receives data and control commands to and from the storage system 1000 via this port. The management I/F 1150 is an interface with the management network 1400 for transmitting and receiving data and control commands to and from the management computer 1200 and storage system 1000 for the purposes of system management.

The memory 1160 stores an application 1161, the recovery manager 1162, and a consistency check time acquisition agent 1163. The CPU 1130 realizes various functions by executing the various programs stored in the memory 1160.

The application 1161 is an application program using the data volumes 1011, such as a DBMS or a file system, for example.

The recovery manager 1162 is a program for staticizing the application 1161, issuing a request to the storage system 1000 for snapshot acquisition, requesting the restoration of data at a specific point in time, and so on, for example. The recovery manager 1162 also issues a request to the storage system 1000 for marker insertion in accordance with an event such as staticization of the application or a user instruction. The recovery manager 1162 provides a command line interface (to be referred to as a "CLI" hereafter) or the like, which serves as an interface with the user or another program, so that the user or other program can execute these functions.

The consistency check time acquisition agent 1163 is a program for obtaining a time (to be referred to hereafter as a "consistency check time") required by the application 1161 to check the consistency of the data in the data volumes 1011 at a point in time when a request is received from a consistency check time monitor 1256, to be described below, in accordance with this request. For example, when the application 1161 is a DBMS known as Oracle DB, the consistency check time acquisition agent 1163 is capable of obtaining the time required for a crash recovery from a tool known as an MTTR (Mean Time To Repair) advisor as the consistency check time. As another example, when the application 1161 is a typical file system and its resources are not in use in another operation, the time required for FSCK is mainly dependent on the number of files (the number of active i-nodes), and therefore the consistency check time acquisition agent 1163 can estimate the consistency check time from the current number of files by holding a past record value of the time required for past FSCK operations at each file number. Furthermore, it is known that in a journaling file system, FSCK is substantially complete in units of several seconds, and therefore the consistency check time is a time in the region of several seconds.

When the application is a DBMS, the consistency check time acquisition agent 1163 monitors the timing at which the DBMS issues a checkpoint (the timing at which data not reflected in the data volume 1011 are all reflected). When the DBMS issues a checkpoint, the consistency check time acquisition agent 1163 instructs the consistency check time monitor 1256 to acquire the consistency check time.

Note that for ease of description, FIG. 1 shows a single application 1161, but more than one application may be provided in this embodiment.

The management computer 1200 comprises an input apparatus 1240 such as a keyboard or a mouse, a CPU 1230, a display apparatus 1220 such as a CRT, a memory 1250, and a management I/F 1210.

The management I/F 1210 transmits and receives data and control commands to and from the host computer 1100 and storage system 1000 for the purposes of system management.

The memory 1250 stores a setting program 1251, a backup instruction program 1252, a recovery instruction program 1253, a JNLG management table 1254, a volume management table 1255, the consistency check time monitor 1256, and a monitor management table 1257. The CPU 1230 realizes various functions by executing the various programs stored in the memory 1250.

The setting program 1251 is a program for setting values in the JNLG management table 1254, volume management table 1255, and monitor management table 1257. The setting program 1251 provides a CLI or the like as an interface allowing the user to set these values.

The backup instruction program 1252 is a program for recording a staticization point of the application 1161 group belonging to a journal group 1014 selected from among one or more journal groups 1014. Here, the application 1161 group belonging to the journal group 1014 is a collection of applications using one or more of the one or more data volumes 1011 constituting the journal group 1014. Hereafter, an application using a volume belonging to a journal group will be referred to simply as an "application belonging to a journal group". The operations of this program will be described in detail below.

The recovery instruction program 1253 is a program for recovering the application 1161 belonging to an instructed journal group 1014 using data at a specified point in time (the recovery point) in accordance with a user instruction. The operations of this program will be described in detail below.

The consistency check time monitor 1256 is a program for obtaining the time required to perform a consistency check on the data in a data volume 1011 at a specified point in time when the application 1161 belonging to the specified journal group 1014 performs recovery using these data. The operations of this program will be described in detail below.

The JNLG management table 1254, volume management table 1255, and monitor management table 1257 will be described in detail below.

FIGS. 2 to 6 show constitutional examples of the various tables provided in the computer system according to this embodiment. Note that in each of the tables shown in the drawings, the reference numerals denote columns or fields and not the values stored in these columns or fields. Hence, in the following description, a reference numeral will be provided to describe a column or field, and when there is no intention to specify a column or field, a reference numeral will not be provided. This applies likewise in the second and third embodiments.

FIG. 2 is an example of the JNLG management table 1254.

This table 1254 manages the relationship between the applications 1161 and the journal groups 1014 to which the applications 1161 belong. An AP_ID 2001 is a column storing identifiers of the applications 1161 in the computer system. A JNLG_ID 2002 is a column storing identifiers of the journal groups 1014 to which the applications 1161 belong. An AP management network address 2003 is a column storing the network address of the host computer 1100 on which the applications 1161 operate. An IP address, for example, is used as the value stored in the AP management network address 2003.

The relationships between each information element in the JNLG management table 1254 are set by the user using the CLI provided by the setting program 1251.

FIG. 3 is an example of the volume management table 1255.

This table 1255 manages the relationships between the applications 1161 and the data volumes 1011 used by the applications 1161. An AP_ID 3001 is a column storing identifiers of the applications 1161 in the computer system. A data volume ID 3002 is a column storing the IDs of the data volumes 1011 used by the applications 1161. A storage management network address 3003 is a column storing the network address of the storage system 1000 in which the data volumes 1011 are stored. An IP address, for example, is used as the value stored in the storage management network address 3003.

The relationships between each information element in the volume management table 1255 are set by the user using the CLI provided by the setting program 1251.

FIG. 4 is an example of the monitor management table 1257.

This table 1257 manages the interval at which the consistency check time of the applications 1161 belonging to the journal groups 1014 is acquired. A JNLG_ID 4001 is a column storing IDs of the journal groups 1014 to which the acquisition subject application 1161 group belongs. A monitor interval 4002 is a column storing the interval at which the consistency check time of the applications 1161 belonging to the journal groups 1014 is acquired. For example, when the value stored in the monitor interval 4002 is "60 sec", the consistency check time is acquired at 60 second intervals.

The relationships between each information element in the monitor management table 1257 are set by the user using the CLI provided by the setting program 1251.

FIG. 5 is an example of the marker management table 1030.

This table 1030 is a table for managing the markers. This table 1030 is also managed by each journal group 1014. A time 5001 is a column storing the creation time of the marker. A sequence number 5002 is a column storing the sequence number allocated to the corresponding marker. As noted above, the sequence number shows the creation sequence relationship between the marker, journal, and snapshot. Data 5003 serve as a column storing the text data attached to the marker.

The markers managed by the marker management table 1030 are created in the following manner, for example. The recovery manager 1162 or backup instruction program 1252, to be described below, issues a request to the control program 1028 for marker creation using the text data to be attached to the marker as a parameter. Having received the creation request, the control program 1028 obtains the time at which the marker creation request was received from the timer 1024, for example, and sets this in the time 5001. Further, the control program 1028 allocates the current sequence number to the marker, and sets this sequence number in the sequence number 5002. At this time, as described above, 1 is added to the sequence number managed by the control program 1028 for each journal group. Further, the control program 1028 sets the text data specified as the parameter in the data 5003. More specifically, the data 5003 include text data such as "staticization point" or "consistency check time (DB1: 100 sec, DB2: 150 sec, FS3: 0 sec)" (the data may take a format other than text).

FIG. 6 is an example of the journal management table 1031.

This table 1031 manages metadata of the journal. This table is also managed by each journal group. A time 6001 is a column storing the creation time of the journal. A sequence number 6002 is a column storing the sequence number allocated to the corresponding journal. As noted above, the sequence number shows the creation sequence relationship between the marker, journal, and snapshot. An application destination volume 6003 is a column storing an identifier of the data volume 1011 to which the journal is applied. An application destination address 6004 is a column storing an address to which the journal is applied. A storage volume 6005 is a column storing an identifier of a volume in which the journal is stored. A storage address 6006 is a column storing an address at which the journal is stored. A data length 6007 is a column storing the length of the journal.

The control program 1028 sets values in these columns every time a journal is created in relation to writing from the host computer 1100. First, the control program 1028 obtains the time at which a journal creation request was received from the timer 1024, for example, and sets this in the time 6001. Then, the control program 1028 allocates the current sequence number to the journal, and sets this sequence number in the sequence number 6002. At this time, as described above, 1 is added to the sequence number managed by the control program 1028 for each journal group. The control program 1028 then refers to the write request and sets the identifier of the write destination data volume 1011 in the application destination volume 6003, sets the address of the write destination in the application destination address 6004, sets the ID of the volume storing the journal in the storage volume 6005, sets the address at which the journal is stored in the storage address 6006, and sets the length of the write data in the data length 6007.

Although not shown in FIG. 1, the main memory 1026 stores a snapshot volume management table 24000 and an SSVOL group management table 25000.

FIG. 24 shows a constitutional example of the snapshot volume management table 24000.

Information relating to the snapshots constituting the SSVOL group 1015 is recorded in the snapshot volume management table 24000. For example, the ID of the SSVOL group, the IDs of the snapshot volumes belonging to the SSVOL group, and the IDs of the data volumes associated with the SSVOL group are stored in each SSVOL group (snapshot volume group) 1015. More specifically, for example, an SSVOL group ID 24001, a snapshot volume ID 24002, and an associated data volume ID 24003 are provided in the table.

The SSVOL group ID 24001 is a column storing identifiers of the management subject SSVOL groups.

The snapshot volume ID 24002 is a column storing logical volume (snapshot volume) identifiers. Each entry (cell) of this column stores the ID of a snapshot volume belonging to the SSVOL group allocated with the SSVOL group ID to which the entry corresponds.

The associated data volume ID 24003 stores identifiers of the data volumes to be subjected to snapshot acquisition. Each entry (cell) of this column stores the ID of a data volume associated with the SSVOL group that is allocated with the SSVOL group ID to which the entry corresponds.

These values can be set by a manager using the CLI provided by the setting program 1251, for example, by adding a logical volume serving as a snapshot volume to the SSVOL group.

FIG. 25 shows a constitutional example of the SSVOL group management table 25000.

Information relating to the associations between the journal groups 1014 and SSVOL groups 1015 is recorded in the SSVOL group management table 25000. For example, the ID of the corresponding journal group, the ID of the SSVOL group corresponding to the journal group, the sequence number of the snapshot corresponding to the SSVOL group, and the acquisition time of the corresponding snapshot are recorded for each journal group 1014. More specifically, for example, a JNLG_ID 25001, an SSVOL group ID 25002, a sequence number 25003, and an acquisition time 25004 are provided in the table 25000.

The JNLG_ID 25001 is a column storing identifiers of the management subject journal groups.

The SSVOL group ID 25002 stores identifiers of the SSVOL groups storing snapshots of the journal groups listed in the JNLG_ID 25001.

These values can be set by a manager using the CLI provided by the setting program 1251, for example, by associating an SSVOL group with a journal group.

The sequence number 25003 is a column storing the sequence numbers allocated to the snapshots. As noted above, the sequence number indicates the creation sequence relationship between the marker, the journal, and the snapshot.

The acquisition time 25004 is a column storing the time at which the snapshot was created.

(2) Operations of First Embodiment

Next, the operations of this embodiment will be described.

Figure 7:
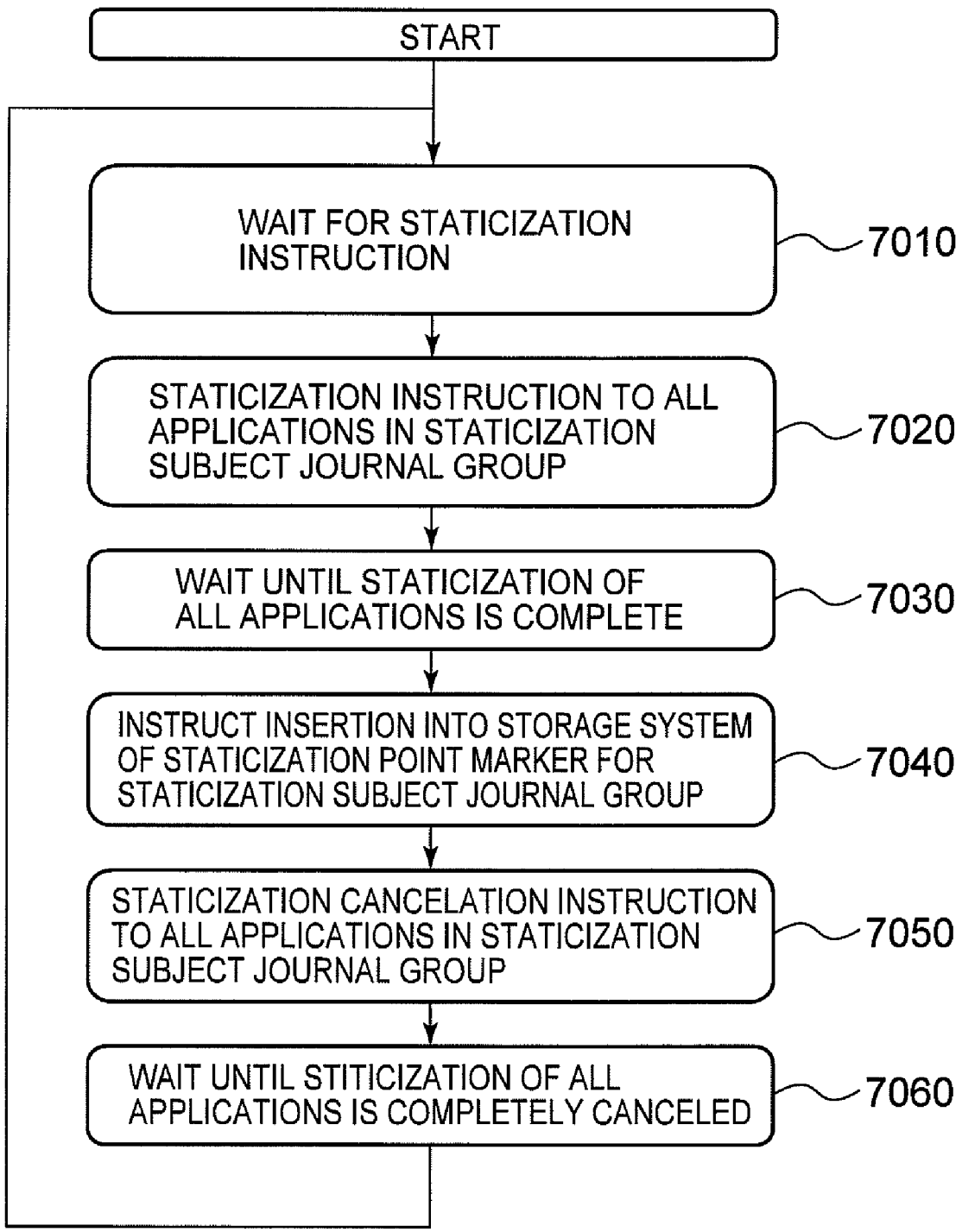
FIG. 7 is a view showing the processing flow of a backup instruction program in the first embodiment.

FIG. 7 shows the flow of processing of the backup instruction program 1252.

In this processing, the point in time at which data consistency is achieved is recorded for all of the cooperating applications 1161. This processing is begun when the user activates the backup instruction program 1252.

When the processing is activated, first the backup instruction program 1252 waits until a staticization instruction is generated (step 7010). The staticization instruction is generated when the user or a job scheduler issues a request for staticization via a CLI provided by the backup instruction program 1252, for example. The user or job scheduler specifies a specific journal group 1014 as a parameter of the CLI.

Upon reception of the staticization instruction, the backup instruction program 1252 staticizes all of the applications 1161 belonging to the journal group 1014 specified in the parameter (step 7020). The staticization subject applications 1161 can be specified by referring to the JNLG management table 1254. In this step, the backup instruction program 1252 communicates with the recovery manager 1162 so as to issue a staticization instruction relating to the applications 1161 to the recovery manager 1162. This communication is established using an AP management network address and a unique port number of the recovery manager 1162.

Next, the backup instruction program 1252 waits until staticization of all of the applications 1161 specified in the step 7020 is complete (step 7030).

Having confirmed that staticization of all of the applications 1161 is complete, the backup instruction program 1252 instructs the control program 1028 to insert a marker as the staticization point of the journal group 1014 specified by the parameter (step 7040). In this step, the backup instruction program 1252 communicates with the control program 1028 and issues a marker insertion instruction thereto. This communication is established using one of the storage management network addresses 3003 corresponding to the data volumes 1011 belonging to the journal group 1014 specified by the parameter, and a unique port number of the control program 1028. Having received the instruction, the control program 1028 creates the marker in the manner described above, and stores the marker in the marker management table 1030.

Next, the backup instruction program 1252 cancels staticization of all of the applications 1161 belonging to the journal group 1014 specified by the parameter (step 7050). In this step, similarly to the step 7020, the backup instruction program 1252 communicates with the recovery manager 1162 so as to issue a staticization cancellation instruction to the recovery manager 1162.

Next, the backup instruction program 1252 waits until staticization of all of the applications 1161 specified in the step 7050 is completely canceled (step 7060).

When staticization of all of the applications 1161 is completely canceled, the processing of the backup instruction program 1252 returns to the step 7010.

The flow the processing of the backup instruction program 1252 was described above.

Figure 8:
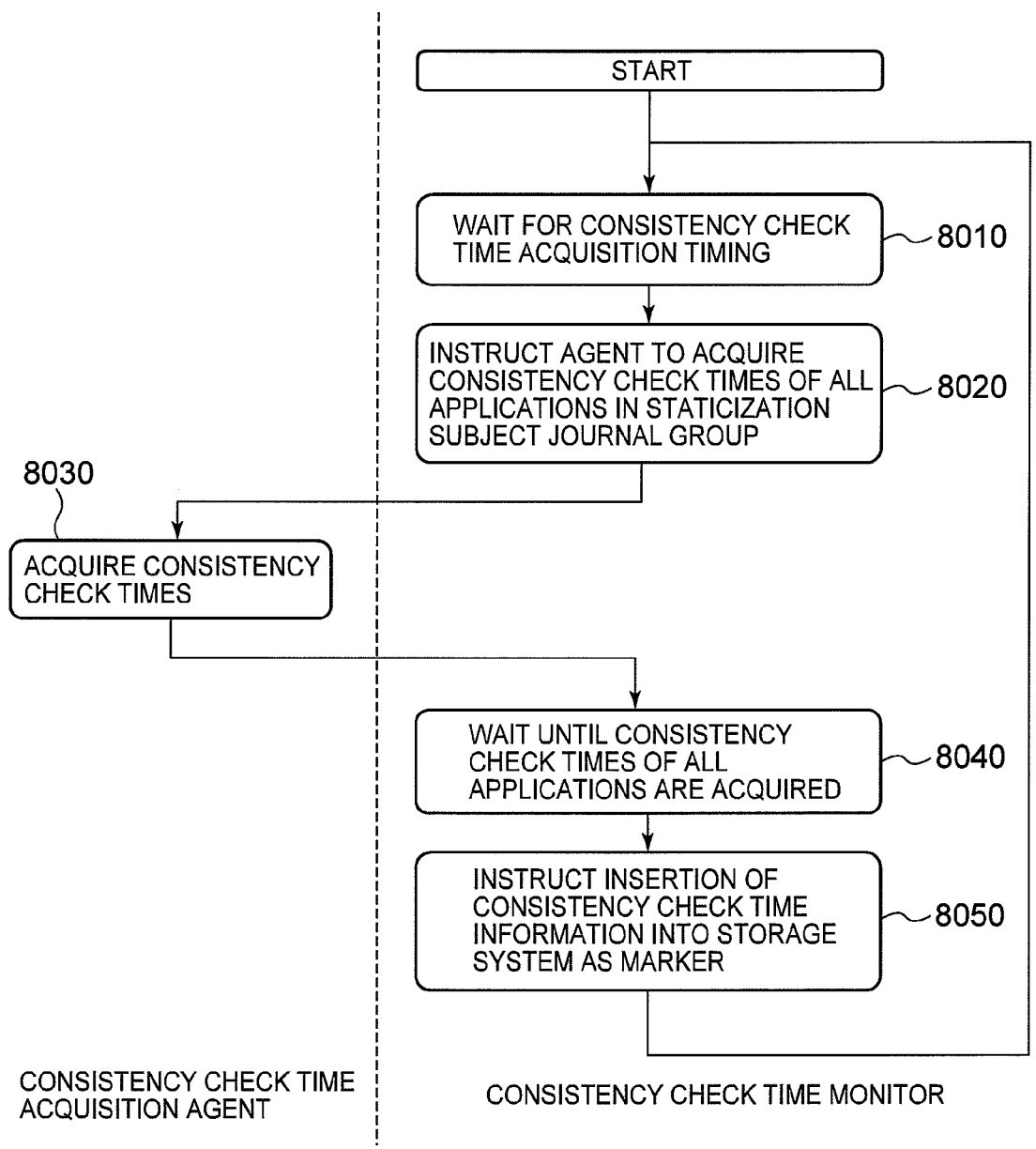
FIG. 8 is a view showing one processing flow of a consistency check time monitor and a consistency check time acquisition agent in the first embodiment.

FIG. 8 shows one of the processing flows of the consistency check time monitor 1256 and the consistency check time acquisition agent 1163.

In this processing, the time required to check the consistency of the data in the data volumes 1011 of each application 1161 at a specific point in time, or in other words the consistency check time, is recorded. This processing is begun when the user activates the consistency check time monitor 1256, specifying a specific journal group 1014 as a parameter.

When the processing is activated, first the consistency check time monitor 1256 waits for the consistency check time acquisition timing (step 8010). The length of the wait is determined on the basis of the monitor interval 4002 corresponding to the journal group 1014 specified in the parameter. For example, when the value stored in the monitor interval 4002 corresponding to the appropriate journal group 1014 in the monitor management table 1257 is "60 sec", the consistency check time monitor 1256 waits for sixty seconds.

Next, the consistency check time monitor 1256 issues a request to the consistency check time acquisition agent 1163 for acquisition of the consistency check time relating to the data in the data volumes 1011 at the point in time of the processing of this step (step 8020). This request is notified to the consistency check time acquisition agents 1163 on all of the host computers 1100 on which the applications 1161 belonging to the journal group 1014 specified in the parameter operate. In this step, the consistency check time monitor 1256 communicates with the consistency check time acquisition agent 1163. This communication is established using an AP management network address an a unique port number of the consistency check time acquisition agent 1163.

Having received the consistency check time acquisition instruction, the consistency check time acquisition agent 1163 acquires the application consistency check time, and notifies the consistency check time monitor 1256 of the acquired consistency check time (step 8030). As described above, the consistency check time is acquired using an MTTR advisor or the like.

The consistency check time monitor 1256 then waits for completion responses from all of the consistency check time acquisition agents 1163 instructed to obtain the application consistency check time (step 8040).

Once completion responses have been returned from all of the consistency check time acquisition agents 1163, the consistency check time monitor 1256 instructs the control program 1028 to insert the obtained consistency check time information as a marker into the marker management table 1030 of the journal group 1014 specified by the parameter (step 8050). Here, the text data attached to the marker reads "consistency check time (DB1: 100 sec, DB2: 150 sec, FS3: 0 sec)", for example. This means that the consistency check time of the application 1161 having the identifier DB1 is 100 seconds, the consistency check time of the application 1161 having the identifier DB2 is 150 seconds, and the consistency check time of the application 1161 having the identifier FS3 is 0 seconds. The processing of the consistency check time monitor 1256 then returns to the step 8010.

One of the processing flows of the consistency check time monitor 1256 and the consistency check time acquisition agent 1163 was described above.

Note that in the step 8050, the consistency check time information is stored in the marker management table 1030 as a marker, but as a modified example, the consistency check time monitor 1256 may instruct insertion of an appropriate identifier as the marker, and the relationship between this identifier and the consistency check time may be managed in the memory 1250.

Figure 9:
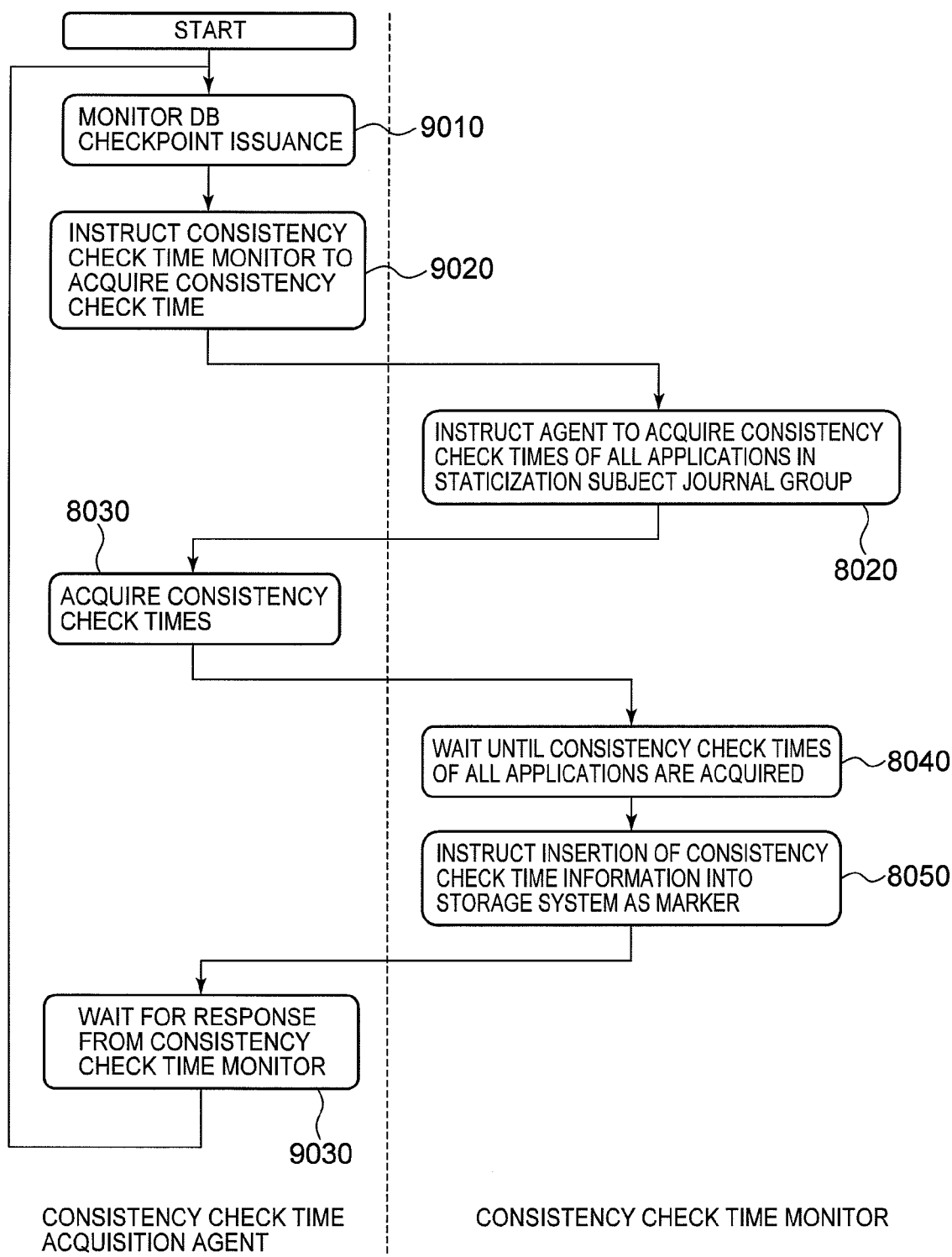
FIG. 9 is a view showing another processing flow of the consistency check time acquisition agent 1163 and the consistency check time monitor in the first embodiment.

FIG. 9 shows one of the processing flows of the consistency check time acquisition agent 1163 and the consistency check time monitor 1256.

In this processing, the consistency check time of the data in the data volumes 1011 of each application 1161 at a specific point in time is recorded in accordance with the timing at which a single DBMS issues a checkpoint or the like. This processing is begun when the user activates the consistency check time acquisition agent 1163, specifying the network address of the management computer 1200 as a parameter. Note that this processing includes parts that are identical to the processing illustrated in FIG. 8, and therefore description of these identical parts has been omitted.

When the processing is activated, first the consistency check time acquisition agent 1163 monitors the checkpoint issuance timing of the DBMS (step 9010).

When the DBMS issues a checkpoint, the consistency check time acquisition agent 1163 issues a request to the consistency check time monitor 1256 for acquisition of the consistency check time of all of the applications 1161 belonging to the journal group (staticization subject journal group) 1014 to which the DBMS belongs. At this time, the consistency check time acquisition agent 1163 establishes communication with the consistency check time monitor 1256 using the network address specified by the parameter and a unique port number of the consistency check time monitor 1256 (step 9020).

The processing of the step 8020 to the step 8050, performed after the consistency check time monitor 1256 receives the request, is as described above.

The consistency check time acquisition agent 1163 then waits for a response from the consistency check time monitor 1256 relating to the request for acquisition of the consistency check times of all of the applications 1161 belonging to the staticization subject journal group 1014 (step 9030). As soon as a response is received, the processing of the consistency check time acquisition agent 1163 advances to the step 9010.

One of the processing flows of the consistency check time monitor 1256 and the consistency check time acquisition agent 1163 was described above. By means of this processing, the point in time at which the consistency check time of an application 1161 such as a DBMS reaches zero can be recorded.

FIG. 10 shows the flow of processing of the recovery instruction program 1253.

This processing is begun when the user activates the recovery instruction program 1253, specifying a specific journal group 1014 as a parameter.

When the processing is activated, first the recovery instruction program 1253 obtains a time range in which the specified journal group 1014 is restorable from the control program 1028 (step 10010). The control program 1028 is capable of calculating the restorable time range by referring to the SSVOL group management table 25000. This range is expressed in the form of "2006/11/10 0:00 to 2006/11/15 11:00", for example.

Next, the recovery instruction program 1253 obtains the information in the marker management table 1030 relating to the specified journal group 1014 from the control program 1028 (step 10020).

Next, the recovery instruction program 1253 uses the restorable time range obtained in the step 10010 and the marker information obtained in the step 10020 to provide the user with a recovery point selection screen through a GUI (graphical user interface) (step 10030). An example of the display format thereof will be described below. Note that a CUI (character user interface) may be provided as a modified example.

From the provided recovery point selection screen, the user selects a recovery point (step 10040).

Next, the recovery instruction program 1253 determines whether or not the selected recovery point is the staticization point (step 10050). For example, the recovery instruction program 1253 determines whether or not the selected recovery point is the staticization point from the information in the marker management table 1030 obtained in the step 10020.

When the selected recovery point is the staticization point (step 10050: YES), the recovery instruction program 1253 instructs the control program 1028 to restore the journal group 1014 specified by the parameter (step 10060). This instruction is executed by establishing communication using the storage management network address 3003 and a unique port number of the control program 1028. Upon reception of this instruction, the control program 1028 executes restoration.

Next, the recovery instruction program 1253 waits until the restoration instructed in the step 10060 is complete (step 10070). When the restoration is complete, the recovery instruction program 1253 instructs all of the applications 1161 belonging to the specified journal group 1014 to perform a consistency check (step 10080). When the recovery point is the staticization point, the applications 1161 that receive the consistency check instruction perform volume mounting without performing a data consistency check such as FSCK. Note that when the recovery point is the staticization point, the recovery instruction program 1253 may instruct the applications 1161 to perform volume mounting instead of a consistency check.

Next, the recovery instruction program 1253 waits until the consistency check instructed in the step 10080 is complete (step 10090). When the consistency check is complete, the processing ends.

On the other hand, when it is determined in the step 10050 that the recovery point is not the staticization point (step 10050: NO), the recovery instruction program 1253 estimates a consistency check time for each application 1161 (step 10100). At this time, the recovery instruction program 1253 obtains markers attached with a consistency check time closest to the recovery point in the past and a consistency check time closest to the recovery point in the future (to be referred to hereafter as an immediately preceding marker and an immediately following marker, respectively) from the information in the marker management table 1030 obtained in the step 10020. The recovery instruction program 1253 then estimates the consistency check time of each application from these two markers. For example, when the application 1161 is a DBMS, the time required for a crash recovery is typically 0 seconds at a specific moment (usually the checkpoint creation timing), and increases monotonously thereafter. Hence, the recovery instruction program 1253 is capable of calculating an approximate rate of change in the consistency check time from the consistency check times indicated by the immediately preceding marker and the immediately following marker, and estimating the consistency check time at the recovery point from these values. In this embodiment, the recovery instruction program 1253 uses an average of the consistency check time at the immediately preceding marker and the consistency check time at the immediately following marker as the estimated value of the consistency check time at the recovery point. As a modified example, an estimated value may be determined by applying a weighting according to the degree to which the time at the recovery point is removed from the insertion time of the immediately preceding and immediately following markers. Alternatively, the consistency check time at the immediately preceding marker and the consistency check time at the immediately following marker may be handled as estimated values. Further, when there is no immediately following marker, the consistency check time attached to the immediately preceding marker may be used as an estimated value. Moreover, when the application 1161 is a typical file system, the average value of the consistency check time indicated by the immediately preceding marker and the consistency check time indicated by the immediately following marker serves as an estimated value. When the application 1161 is a journaling file system, the consistency check time is substantially several seconds.

Next, the recovery instruction program 1253 instructs the control program 1028 to restore the volumes used by the application 1161 having the longest estimated consistency check time value (step 10110). Upon reception of this instruction, the control program 1028 executes restoration employing journaling.

Next, the recovery instruction program 1253 waits until the restoration instructed in the step 10110 is complete (step 10120).

When restoration is complete, the recovery instruction program 1253 instructs the application 1161 using the volumes for which restoration was instructed in the step 10110 to perform a consistency check (step 10130).

Next, the recovery instruction program 1253 determines whether or not any non-restored volumes remain (step 10140). When all volumes have been restored (step 10140: NO), the processing of the recovery instruction program 1253 advances to the step 10090, where the recovery instruction program 1253 waits until the consistency checks instructed in the step 10130 are all complete. When all of the consistency checks are complete, the recovery instruction program 1253 terminates the processing.

On the other hand, when non-restored volumes remain (step 10140: YES), the recovery instruction program 1253 instructs the control program 1028 to restore the volume, other than the recently restored volumes, for which the estimated consistency check time value of the application 1161 using the volume is longest (step 10150). The processing of the recovery instruction program 1253 then advances to the step 10120.

The flow of processing of the recovery instruction program 1253 was described above.

Note that in this embodiment, volume restoration is instructed in the step 10110 and the step 10150 in relation to each single application 1161, but as a modified example, volume restoration may be instructed in relation to all of the plurality of volumes used by the plurality of applications 1161 collectively. In some storage systems 1000, such as a storage system 1000 having a plurality of CPUs 1023, a specific number of volumes may be restored in parallel without inhibiting the individual restoration performance. When this type of storage system 1000 is used, a plurality of volumes may be restored in parallel up to an upper limit at which the restoration performance is not inhibited. Hence, when the number of volumes used by a single application 1161 is lower than this upper limit, the recovery instruction program 1253 may instruct restoration of the volumes of another application 1161 within a range that does not exceed the upper limit of the number of volumes undergoing restoration. Note that the restoration subject volumes at this time are selected in sequence from the application 1161 having the longest consistency check time.

Furthermore, in this embodiment, the consistency check time of the application 1161 is estimated in the step 10100, and the restoration sequence of the volumes used thereby is determined according to the length of the consistency check time. However, as a modified example, the restoration sequence of the volumes used by the application 1161 may be determined according to the type of the application 1161. More specifically, the consistency check time of a typical file system is usually long, and therefore the volumes used by a typical file system may be restored preferentially. Further, the consistency check time of a journaling file system is usually several seconds, and therefore the volumes used by the journaling file system may be restored later. The volume restoration sequence may be determined using this method.

Figure 11A:
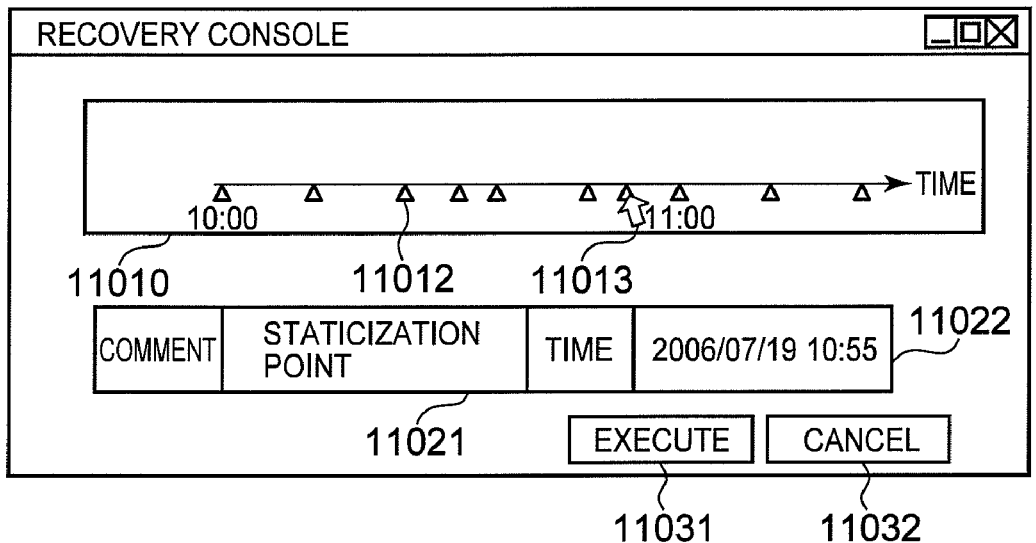
FIG. 11A is an example of a GUI provided to a user by the recovery instruction program in the first embodiment.

FIG. 11A is an example of the GUI provided to the user by the recovery instruction program 1253 in the step 10030.

The reference numeral 11010 denotes a diagram showing the restorable time range in the form of a number line. The reference numeral 11012 is an icon showing the marker insertion time. The shape and color of the icon 11012 may be changed according to the content of the text data attached to the marker. The reference numeral 11013 is a pointer that is moved by an input apparatus such as a mouse. The user moves the pointer 11013 in the step 10040 when selecting the recovery point.

The reference numeral 10021 is a text field displaying the text data attached to the marker. When the user moves the pointer 11013 to the icon 11012 on the number line having the reference numeral 11010 and clicks, the text data included in the marker corresponding to the icon 11012 is displayed in the text field 10021. Note that nothing is displayed in the text field 11021 when a point on the number line where no icon 11012 exists is clicked. The reference numeral 11022 is a text field displaying the time at the recovery point. When the user moves the pointer 11013 to a point on the number line having the reference numeral 11010 and clicks, the time corresponding to this point is displayed in the text field 11022.

The reference numeral 11031 is a button for confirming selection of a recovery point. When the user presses the button 11031, a request is transmitted to the recovery instruction program 1253 to recover the data at the point in time displayed in the text field 11022. The reference numeral 11032 is a button for ending the processing described using FIG. 10. When the user presses this button 11032, a request is transmitted to the recovery instruction program 1253 to terminate the processing described using FIG. 10. Having received this request, the recovery instruction program 1253 forcibly terminates the processing.

An example of the interface displayed in the step 10030 was described above.

Figure 11B:
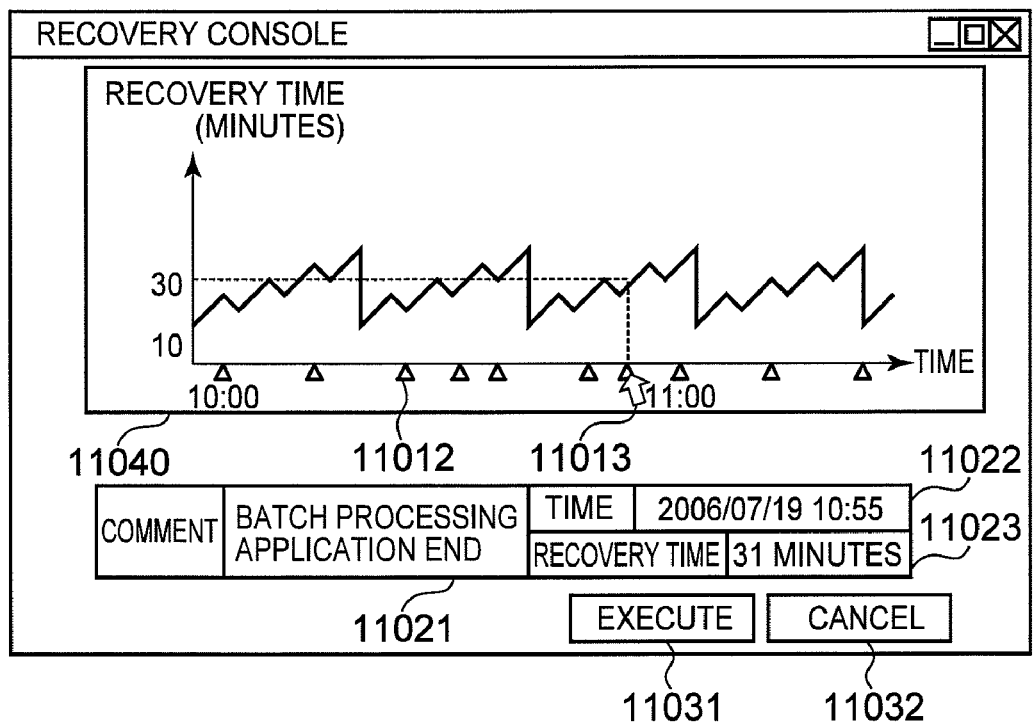
FIG. 11B is another example of a GUI provided to the user by the recovery instruction program in the first embodiment.

FIG. 11B is another example of the GUI provided to the user by the recovery instruction program 1253 in the step 10030.

The reference numeral 11040 is a two-dimensional graph showing the relationship between the restorable time range and the time remaining to the resumption of operations of the compound application. Here, the term "compound application" refers to all of the plurality of applications operating in conjunction. Accordingly, the time remaining to the resumption of operations of the compound application is the time required to complete recovery of all of the volumes used by each of the plurality of applications operating in conjunction. Note that the time required for recovery is the sum total of the time required for restoration and the consistency check time. The abscissa of the graph 11040 shows the restorable time. The ordinate of the graph 11040 shows the time remaining to the resumption of operations of the compound application.

The reference numerals 11012, 11013, 11021, 11022, 11031, and 11032 are similar to those of FIG. 1A, and hence description thereof has been omitted.

The reference numeral 11023 is a text field displaying the time remaining to the resumption of operations of the compound application. When the user moves the pointer 11013 to a point on the abscissa and clicks, the time remaining to the resumption of operations of the compound application corresponding to this point is displayed in the text field 11023.

Note that in order to display the recovery time on this GUI, the time remaining to the resumption of operations of the compound application must be calculated in advance. Hence, in the step 10020, the recovery instruction program 1253 obtains the information in the journal management table 1031 and a journal application speed. The recovery instruction program 1253 then calculates the journal application amount to each volume at each point in time using the values stored in the application destination volume 6003, the values stored in the application destination address 6004, and the values stored in the data length 6007 in the journal management table 1031. Further, the recovery instruction program 1253 determines the volume restoration sequence at each point in time within the restorable range. Then, on the basis of this information, the recovery instruction program 1253 simulates the time of a real restoration. More specifically, first the journal application amount of each volume is divided by the journal application speed to calculate the time required for restoration of each volume. The restoration times calculated for each volume are then added together in the restoration sequence to calculate the actual time required to complete restoration of each volume (to be referred to as the "restoration completion time" hereafter). The restoration completion time of the volumes used by each application 1161 (when each application 1161 uses a plurality of volumes, the longest restoration completion time) is then added to the estimated consistency check time value of the corresponding application 1161, whereby the time required for recovery of each application 1161 is calculated. The longest of the times required for recovery of the plurality of applications 1161 serves as the time remaining to the resumption of operations of the computer system in which the plurality of applications operate in conjunction.

By restoring the data of the application 1161 having the longest restored data consistency check time preferentially such that restoration of these data ends earlier than that of the other applications 1161, consistency check processing that takes a long time can be executed earlier. Further, since this consistency check processing is performed on the host computer 1100 and does not affect the restoration processing performance of the storage system 1000, the data of the other applications 1161 can be restored in parallel with this processing. As a result, the time required to resume operations of the computer system, in which the plurality of applications 1161 operate in conjunction, can be shortened.

Second Embodiment

Next, a second embodiment will be described.

This embodiment is an example of the restoration of a plurality of applications that cooperate loosely in a workflow. The storage system of this embodiment comprises volumes storing the data of these applications, and backs up (and restores) these data using a backup technique employing journaling.

In this computer system, the plurality of applications perform processing independently, without accessing each other's processing. When each application completes its processing, a processing result is transmitted to a host computer on which the application that is to start the next processing operates through FTP (File Transfer Protocol) or the like. Then, using the processing result as input, the application that is to perform processing next begins the processing. Thus, each process is executed independently in sequence, and therefore, when a fault such as data corruption occurs, operations can be resumed by recovering the application that is to perform the processing that begins immediately after the recovery point. Note that each process will be referred to as a job. Further, the job execution sequence will be defined as the workflow.

Incidentally, as described above, when all of the volumes are restored collectively, the time required for the completion of restoration increases in relation to all of the volumes. As a result, the job start time is delayed in all of the applications, and the time required to resume operations lengthens.

In this embodiment, to solve this problem, the restoration priority is increased steadily in relation to applications in which a job is started earlier, using the recovery point as a starting point. Thus, recovery is performed earliest in the applications that have to begin processing immediately after recovery, and as a result, the time required to resume operations can be shortened.

The system configuration and operations of this embodiment will be described below. The description will focus mainly on differences with the first embodiment, and the description of commonalities with the first embodiment will be omitted or simplified.

(1) System Configuration of Second Embodiment

Figure 12:
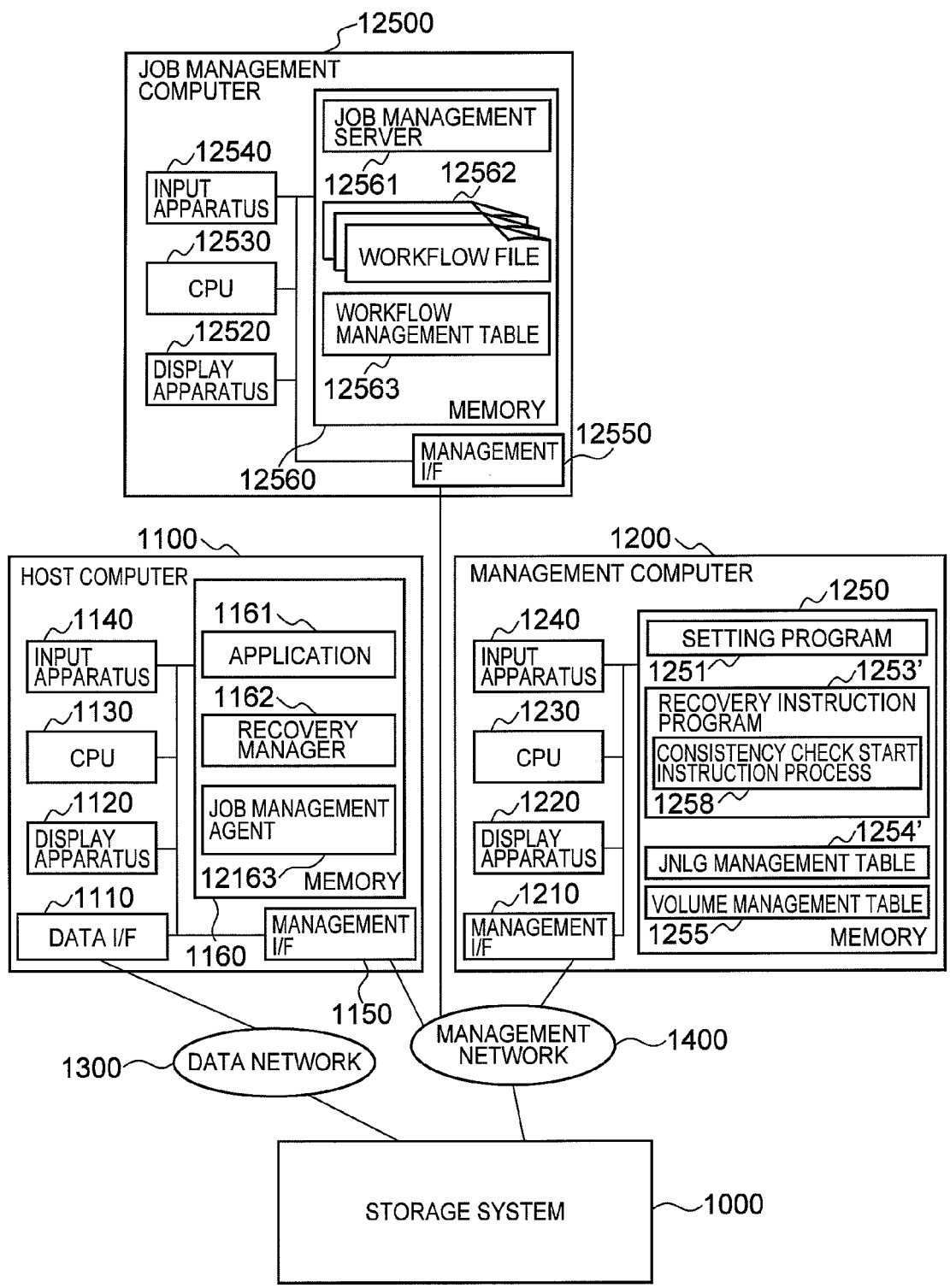
FIG. 12 is a view showing the system configuration of a second embodiment.

FIG. 12 is a block diagram showing the configuration of a computer system according to this embodiment.

In this system, a job management computer 12500 is added to the system configuration of the first embodiment. The job management computer 12500 is connected to the storage system 1000, host computer 1100, and management computer 1200 via the management network 1400.

The constitution of the storage system 1000 is identical to that of the first embodiment, and hence description thereof has been omitted.

The memory 1160 of the host computer 1100 additionally stores a job management agent 12163. There is no need to store the consistency check time acquisition agent 1163 in the memory 1160.

The job management agent 12163 is a program for executing a command of the application 1161 in accordance with a request from a job management server 12561, to be described below. This operation will be described in detail below.

There is no need to store the backup instruction program 1252, the consistency check time monitor 1256, and the monitor management table 1257 in the memory 1250 of the management computer 1200.

A JNLG management table 1254' must be additionally capable of managing the operational state of the application 1161. This table 1254' will be described in detail below.

Further, a recovery instruction program 1253' differs from that of the first embodiment in that it obtains workflow progress information from the control program 1028 and information relating to a workflow file 12562 from the job management server 12561, to be described below, and starts recovery from the volumes of the application 1161 that is to perform processing immediately after a specified recovery point. The flow of this operation will be described below. Further, the recovery instruction program 1253' comprises a consistency check start instruction process 1258. The consistency check start instruction process 1258 monitors the condition of the application 1161, or in other words the recovery condition of the volumes used by the application 1161. The consistency check start instruction process 1258 then instructs the application 1161 that has completed recovery to start consistency check processing.

The job management computer 12500 comprises an input apparatus 12540 such as a keyboard or a mouse, a CPU 12530, a display apparatus 12520 such as a CRT, a memory 12560, and a management I/F 12550.

The management I/F 12550 transmits and receives data and control commands to and from the host computer 1100, the management computer 1200, and the storage apparatus 1000 for the purposes of system management.

The memory 12560 stores the job management server 12561, the workflow file 12562, and a workflow management table 12563. The CPU 12530 realizes various functions by executing the various programs stored in the memory 12560.

The job management server 12561 is a program for issuing a job start request to the job management agent of the host computer 1100 on which the application 1161 that is to execute the job operates, in accordance with a job execution sequence defined in the workflow file 12562. The job management server 12561 also issues a request to the control program 1028 to insert a marker indicating the progress of the workflow every time a job is completed. Note that this operation will be described in detail below.

The workflow management table 12563 will be described in detail below.

FIG. 13 is an example of the workflow file 12562.

The workflow file 12562 performs workflow management, or in other words management of the job execution sequence. A unique identifier is allocated to each workflow in the job management computer 12500. An execution sequence 13001 stores the sequence numbers of the jobs that are executed in the workflow. An AP_ID 13002 stores the ID of the application that executes the job. A command 13003 stores the CLI of a command of the job. An AP management network address 13004 stores the network address of the host computer that executes the job. An IP address, for example, is used as the value stored in the AP management network address 13004. These values a reset when the user defines the workflow using a GUI provided by the job management server 12561.

An operational state 13005 stores the operational state of the application 1161 that executes the job. One of "operational" and "in recovery", for example, may be used as the value stored in the operational state 13005. In this embodiment, "operational" is set in the operational state 13005 by the job management server 12561 when the user defines the workflow.

FIG. 14 is an example of the workflow management table 12563.

This table 12563 manages the progress of the workflow. A workflow ID 14001 is a column storing an identifier of the management subject workflow. A start time 14002 is a column storing the start timing of the workflow. The values stored in these columns are set when the workflow is defined by the user using a GUI provided by the job management server 12561.

A progress state 14003 is a column storing the state of progress of the workflow. If the workflow has yet to begin, "WAIT", for example, is stored in this column 14003. If the workflow is complete, "DONE", for example, is stored in the column 14003. If the workflow is underway, for example, "0" is stored in the column 14003 immediately after the beginning of the workflow, and every time a job is completed thereafter, the execution sequence number of the completed job is stored in the column 14003.

FIG. 15 is an example of the JNLG management table 1254'.

This table 1254' is substantially identical to that of the first embodiment, and therefore the differences therebetween will be focused on.

A status 15004 is a column storing the operational state of the application 1161. One of "operational", "pre-recovery", and "recovery complete", for example, is stored in this column 15004.

"Operational" is set in this column 15004 when setting the relationship between the application 1161 and the journal group 1014, using a CLU provided by the setting program 1251.

(2) Operations of Second Embodiment

Next, the operations of this embodiment will be described.

Figure 16:
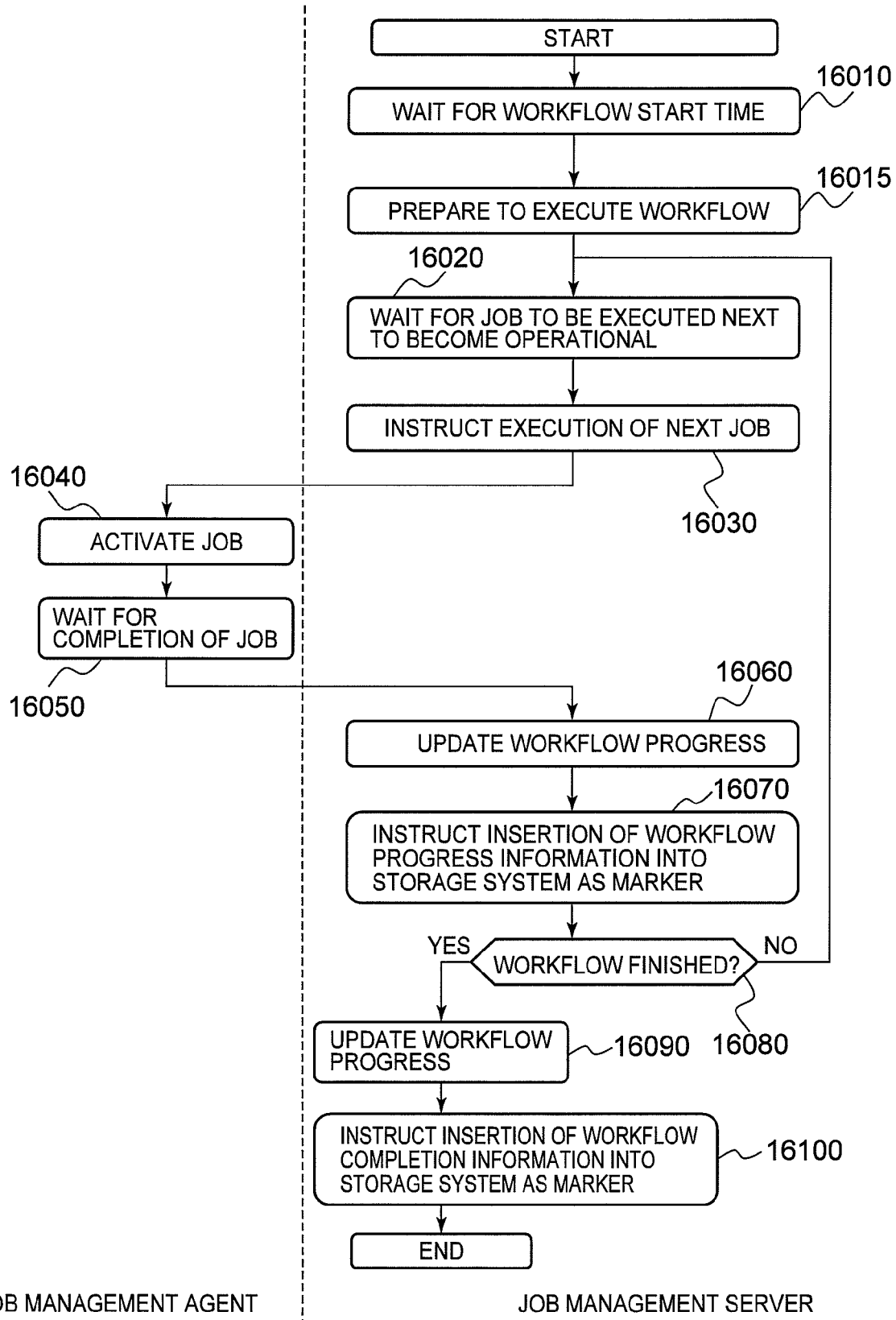
FIG. 16 is a view showing the flow of processing during workflow execution by a job management server and a job management agent in the second embodiment.

First, the flow of processing of the job management server 12561 and job management agent 12163 during execution of the workflow will be described using FIG. 16. This processing is activated by the user using a CLI provided by the job management server 12561.

When the user activates the processing, the job management server 12561 waits for the workflow start time (step 16010). The workflow start time is stored in the workflow management table 12563.

When the start time arrives, the job management server 12561 sets "0" in the progress state 14003 of the workflow subject to execution (to be referred to hereafter as the "execution subject workflow") in the workflow management table 12563 (step 16015).

Next, the job management server 12561 checks the operational state of the application 1161 that is to execute the job about to begin by referring to the workflow file 12562 of the execution subject workflow, and if "operational" is not stored in the operational state, the job management server 12561 waits until the operational state becomes "operational" (step 16020). Note that the job about to begin is the job having an execution sequence number that is greater than the value stored in the progress state 14003 of the workflow under execution by one.

When the operational state becomes "operational", the job management server 12561 instructs the job management agent 12163 to start the job (step 16030). At this time, the job management server 12561 establishes communication with the job management agent 12163 using the AP management network address and a unique port number of the job management agent 12163 and transmits a job start instruction thereto. Further, the job management server 12561 transmits the application 1161 that is to execute the job and the CLI name thereof together with the job start instruction. When output exists from the job that was completed previously, the job management server 12561 transmits this output to the job management agent 12163.

Having received the job start instruction, the job management agent 12163 activates the job (step 16040) and waits for it to end (step 16050). When the job ends, the job management agent 12163 transmits a job completion notification to the job management server 12561 together with the output of the job.

Having received the completion notification, the job management server 12561 sets the execution sequence number of the completed job in the progress state 14003 of the execution subject workflow (step 16060).

The job management server 12561 then issues a request to the control program 1028 to insert the workflow progress information as a marker (step 16070). On the basis of this request, a marker attached with the text data "workflow ID: 2, progress state: 3", for example, is created. These text data serve as information indicating that jobs up to the execution sequence number 3 are complete in a workflow having the workflow ID 2.

Next, the job management server 12561 determines whether or not all of the jobs in the workflow are complete (step 16080). Here, it is determined that all of the jobs in the workflow are complete when the value stored in the progress state 14003 and the number of jobs defined in the workflow file 12562 of the workflow under execution match.

When uncompleted jobs exist in the workflow (step 16080: NO), the processing of the job management server 12561 returns to the step 16020.

On the other hand, when all of the jobs are complete (step 16080: YES), the job management server 12561 sets "DONE" in the progress state 14003 of the execution subject workflow (step 16090).

The job management server 12561 then issues a request to the control program 1028 to insert workflow completion information as a marker (step 16100). On the basis of this request, a marker attached with the text data "workflow ID: 2, progress state: DONE", for example, is created. This indicates that the workflow having the workflow ID2 is complete.

The flow of processing of the job management server 12561 and job management agent 12163 during workflow execution was described above.

Next, the flow of processing performed when the recovery instruction program 1253' receives a recovery instruction will be described using FIG. 17.

This processing begins when the user activates the recovery instruction program 1253', specifying a specific journal group 1014 as a parameter.

When the user activates this processing, the recovery instruction program 1253' obtains the restorable range and the information in the marker management table 1030 from the control program 1028. The recovery instruction program 1253' also receives a recovery point from the user (steps 10010 to 10040). This processing is similar to that of the first embodiment, and hence description thereof has been omitted.

Next, the recovery instruction program 1253' obtains the information in the workflow file 12562 and the information in the workflow management table 12563 from the job management server 12561 (step 17005). Note that the IP address of the job management computer 12500 and a unique port number of the job management server are set in the recovery instruction program 1253' in advance, and in this step, the recovery instruction program 1253' uses this information to establish communication with the job management server 12561, whereupon the aforementioned information is obtained.

Next, the recovery instruction program' modifies the operational state and status corresponding to all of the recovery subject applications 1161 (step 17010). In this step, the recovery instruction program 1253' specifies the recovery subject applications 1161 from the JNLG management table 1254 and the identifier of the specified journal group. The recovery instruction program 1253' then sets "pre-recovery" in the status 15004 corresponding to the specified applications 1161. Next, the recovery instruction program 1253' issues a request to the job management server 12561 to set "in recovery" in the operational state 13005 corresponding to the specified applications 1161.

Next, the recovery instruction program 1253' activates the consistency check start instruction process 1258 (step 17020). This process is executed by the CPU 1230. The flow of processing in this process will be described below.

Next, the recovery instruction program 1253' determines whether or not a workflow under execution exists at the recovery point (step 17030). The determination of this step is made from the information in the marker management table 1030, obtained in the steps 10010 to 10040, by determining whether or not a workflow whose latest progress state is not "DONE" exists among the progress state-recorded markers inserted at or before the recovery point.

If it is determined in the step 17030 that a workflow under execution does not exist (step 17030: NO), the recovery instruction program 1253' issues a request to the control program 1028 to restore all of the volumes belonging to the specified journal group 1014 (step 17040).

Next, the recovery instruction program 1253' waits until the restoration requested in the step 17040 is complete (step 17045).

When restoration is complete, the recovery instruction program 1253' sets "restoration complete" in the status 15004 corresponding to all of the applications 1161 using the volumes that completed restoration in the step 17045 (step 17050), and then terminates the processing.

On the other hand, when it is determined in the step 17030 that a workflow under execution exists (step 17030: YES), the recovery instruction program 1253' issues a request to the control program 1028 to restore the volumes used by the application 1161 that executes immediately after the recovery point (step 17060). The application 1161 that executes immediately after the recovery point is specified in the following manner. First, the workflow ID and progress state of the workflow executed immediately after the recovery point are obtained by referring to the text data attached to the marker searched for in the step 17030. Next, the job having an execution sequence number that is greater than the value in the progress state by one is specified as the job to be executed next by referring to the workflow file 12562 corresponding to the workflow ID. The application 1161 that is to execute this job is the application 1161 that executes immediately after the recovery point. The volumes used by the application 1161 that executes immediately after the recovery point may be specified from the volume management table 1255.

Next, the recovery instruction program 1253' waits until the restoration requested in the step 17060 is complete (step 17070).

Once the restoration is complete, the recovery instruction program 1253' sets "restoration complete" in the status 15004 corresponding to the application 1161 in which the volumes restored in the step 17070 are used (step 17080).

Next, the recovery instruction program 1253' issues a request to the job management server 12561 to resume the workflow (step 17090). At this time, the recovery instruction program 1253' transmits the progress state value used in the step 17060 to the job management server 12561 as the progress state at the recovery point.

Next, the recovery instruction program 1253' determines whether or not a job to be executed next exists in the workflow (step 17100).

When it is determined in the step 17100 that no job to be executed next exists (step 17100: NO), the recovery instruction program 1253' issues a request to the control program 1028 to restore the volumes that have not yet been restored from among the volumes belonging to the specified journal group 1014 (step 17040).

On the other hand, when it is determined in the step 17100 that a job to be executed next exists (step 17100: YES), a determination is made as to whether or not the volumes of the application 1161 that is to perform the next job have been restored (step 17110). In this determination, when "pre-recovery" is stored in the status 15004 corresponding to the application 1161 that is to execute the job, it is determined that the volumes have not been restored, and when "restoration complete" is stored, it is determined that the volumes have been restored.

When it is determined in the step 17110 that the volumes have been restored (step 17110: NO), the processing of the recovery instruction program 1253' advances to the step 17100. On the other hand, when it is determined that the volumes have not been restored (step 17110: YES), the recovery instruction program 1253' issues a request to the control program 1028 to restore the volumes used by the application 1161 that is to execute the next job (step 17120).

Next, the recovery instruction program 12531 waits until the restoration requested in the step 17120 is complete (step 17130).

When the restoration is complete, the recovery instruction program 1253' sets "restoration complete" in the status 15004 corresponding to the application 1161 that uses the volumes restored in the step 17130 (step 17140). The processing of the recovery instruction program 1253' then returns to the step 17100.

The flow of processing of the recovery instruction program 1253' upon reception of a recovery instruction was described above.

Note that in the steps 17040 to 17050, the non-restored volumes are restored together, but as a modified example, the volumes may be restored in sequence from the volumes used by the application 1161 that executes the job having the smallest execution sequence number in the workflow. In so doing, "restoration complete" is set in the status 15004 corresponding to each application 1161 in sequence from the application 1161 in which restoration of the volumes used thereby is completed first.

Figure 18:
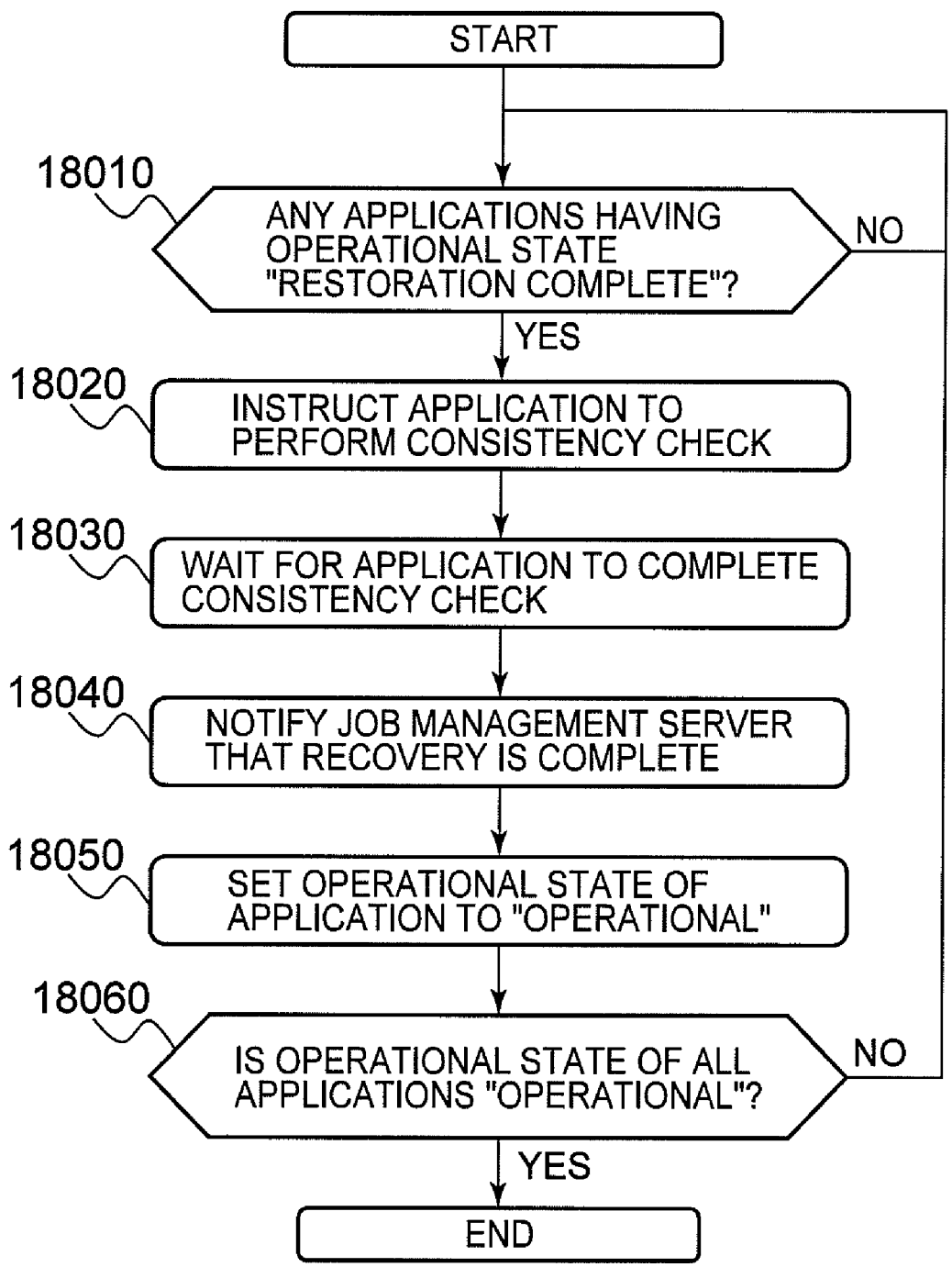
FIG. 18 is a view showing the flow of processing in a consistency check start instruction process of the second embodiment.

Next, the flow of processing of the consistency check start instruction process 1258, which is activated in the step 17020, will be described using FIG. 18.

When this process is activated, the consistency check start instruction process 1258 determines whether or not applications 1161 for which "restoration complete" is stored in the status 15004 of the JNLG management table 1254 exist (step 18010).

When it is determined in the step 18010 that no such applications 1161 exist (step 18010: NO), the determination of the step 18010 is repeated. On the other hand, when it is determined that such applications 1161 exist (step 18010: YES), the consistency check start instruction process 1258 instructs one of these applications 1161 to perform a consistency check (step 18020). Note that at this time, the consistency check start instruction process 1258 establishes communication with the application 1161 using an AP management network address and the unique port number of the job management server, and then issues an instruction to begin the consistency check.

Next, the consistency check start instruction process 1258 waits until the consistency check instructed in the step 18020 is complete (step 18030).

When the consistency check is complete, the consistency check start instruction process 1258 instructs the job management server 12561 to set "operational" in the operational state 13005 corresponding to the application 1161 in which the consistency check is complete (step 18040). Note that this processing is performed after the CPU 1230 establishes communication with the job management server 12561 using the IP address of the job management computer, which is preset in the recovery instruction program, and the unique port number of the job management server.

Next, the consistency check start instruction process 1258 sets "operational" in the status 15004 corresponding to the application 1161 in which the consistency check is complete (step 18050).

Next, the consistency check start instruction process 1258 determines whether or not all of the applications 1161 using the volumes that belong to the journal group 1014 specified as the recovery subject are operational (step 18060). This determination is performed by referring to the status 15004 in the JNLG management table 1254.

When it is determined in the step 18060 that all of the applications are operational (step 18060: YES), the processing ends. On the other hand, when a non-operational application 1161 exists, the processing of the consistency check start instruction process 1258 returns to the step 18010.

The flow of processing of the consistency check start instruction process 1258, which is activated in the step 17020, was described above.

The second embodiment was described above. According to this embodiment, recovery is performed earliest in relation to the applications 1161 that must begin processing immediately after the recovery, and as a result, the time required to resume operations can be shortened.

Third Embodiment

Next, a third embodiment will be described.

The computer system according to this embodiment comprises a storage system that performs backup and restoration using a technique in which a copy group is backed up collectively. This storage system comprises volumes storing the data of a plurality of applications that cooperate loosely, and these volumes are backed up collectively.

A similar problem to that of the second embodiment occurs in this computer system.

Hence, in this embodiment, to solve this problem, the restoration priority is increased steadily in relation to applications in which a job is begun earlier, using the recovery point as a starting point, and applications that have to begin processing immediately after recovery are recovered first. As a result, the time required to resume operations can be shortened.

The system configuration and operations of this embodiment will be described below.

(1) System Configuration of Third Embodiment

The system configuration of this embodiment is largely identical to that of the second embodiment, and therefore the following description will focus mainly on differences.

Figure 19:
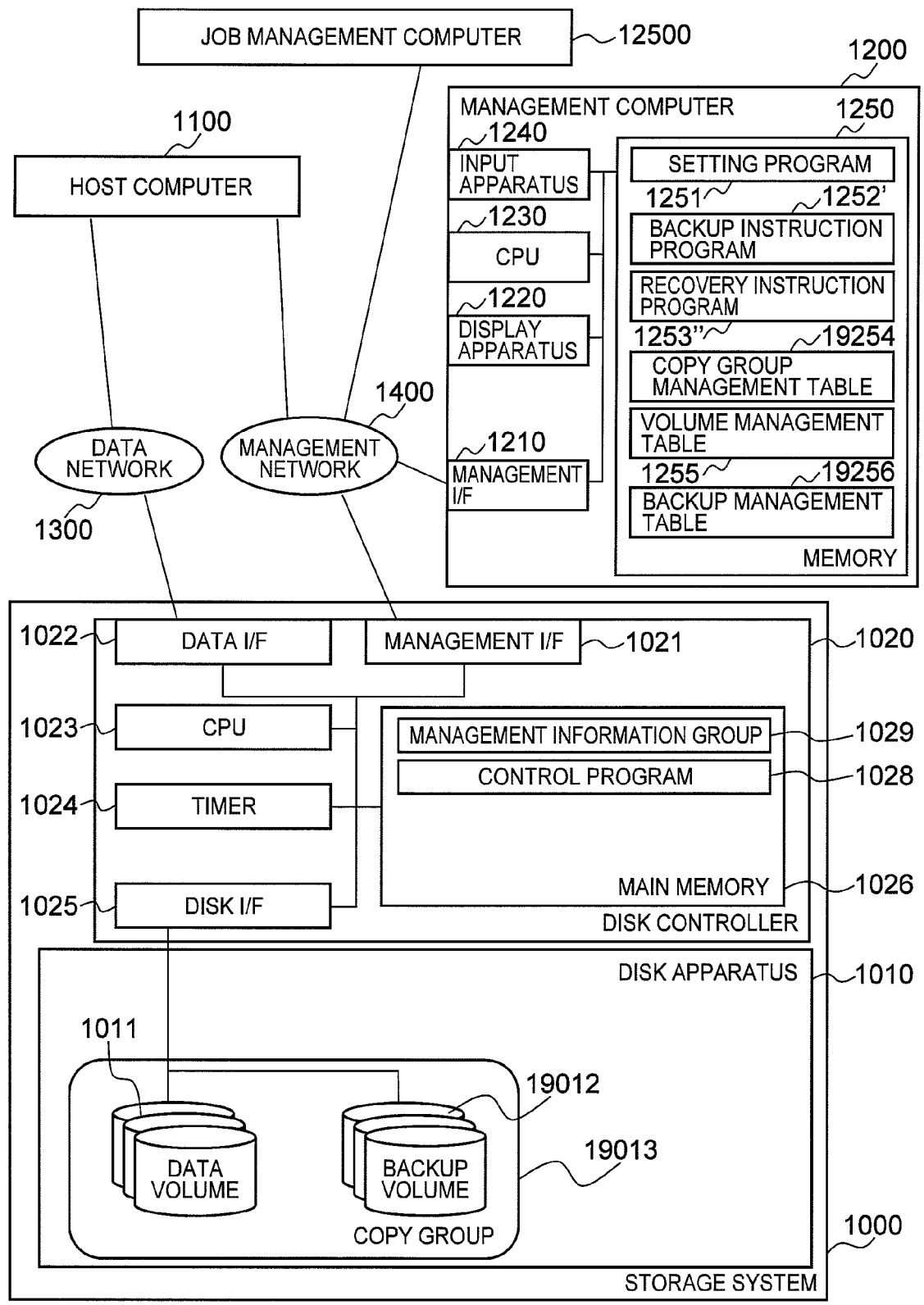
FIG. 19 is a view showing the system configuration of a third embodiment.

FIG. 19 is a block diagram showing the constitution of the computer system according to this embodiment.

One or more copy groups 19013 are stored in the disk apparatus of the storage system 1000 having this constitution. The copy group 19013 is constituted by one or more data volumes 1011 and one or more backup volumes 19012. The data volume 1011 stores data used by the application 1161 that operates on the host computer 1100. The backup volume 19012 stores backup data of the data in the data volume at a specific point in time.

When the control program 1028 of this embodiment receives a request for collective backup of the copy group 19013 from the backup instruction program 1252, the data at the same point in time in all of the data volumes 1011 belonging to the copy group 19013 are copied to the backup volume 19012.

Note that in this embodiment, there is no need to provide the journal groups 1014, the SSVOL groups 1015, the snapshot volumes 1012, and the journal volumes 1013 in the disk apparatus 1010.

Further, there is no need to store the marker management table 1030 and the journal management table 1031 in the main memory 1026.

The host computer 1100 and the job management computer 12500 are identical to those of the second embodiment, and hence description thereof has been omitted.

A backup instruction program 1252', a recovery instruction program 1253", a copy group management table 19254, a backup management table 19256, the setting program 1251, and the volume management table 1255 are stored in the memory 1250 of the management computer 1200.

The setting program 1251 and volume management table 1255 are similar to those of the first embodiment, and hence description thereof has been omitted.

The backup instruction program 1252' and recovery instruction program 1253" are substantially identical to those of the first embodiment, and the differences therebetween will be described below. The copy group management table 19254 and backup management table 19256 will also be described below.

FIG. 20 is an example of the copy group management table 19254.

This table 19254 manages the copy groups 19013 and the applications 1161 that belong thereto. An AP_ID 20001 is a column storing identifiers of the applications 1161 in the system. A CG_ID 20002 is a column storing identifiers of the copy groups 19013 to which the applications 1161 belong. An AP management network address 20003 is a column storing network addresses of the host computers 1100 on which the applications 1161 operate. A status 20004 is a column storing the operational state of the applications 1161. One of "operational", "pre-recovery", and "restoration complete", for example, is stored in this column 20004.

These values are set by the user using a CLI provided by the setting program 1251. Note that "operational" is set in the status 20004 by the setting program 1251.

FIG. 21 is an example of the backup management table 19256.

This table 19256 manages information relating to backup (to be referred to as "backup information" hereafter). A CG_ID 21001 is a column storing identifiers of the copy groups 19013 that are subject to backup data acquisition. An acquisition time 21002 is a column storing the time at which the backup data are acquired. A progress state 21003 is a column storing a state of progress of a workflow that is executed using the applications 1161 belonging to the copy groups 19013 at the point in time when the backup data are acquired. "Workflow ID: 2, progress state: 2" or the like, for example, is stored in this column 21003. This indicates that at the point in time when the backup data are acquired, the second job of a workflow having the workflow ID 2 is complete.

These values are set when backup is acquired by the backup instruction program 1252' upon reception of a backup acquisition request from the user or the like. This operation will be described in detail below.

(2) Operations of Third Embodiment

Next, the operations of this embodiment will be described.

The operations of this embodiment are largely identical to the operations of the second embodiment, and therefore the following description will focus mainly on differences.

Figure 22:
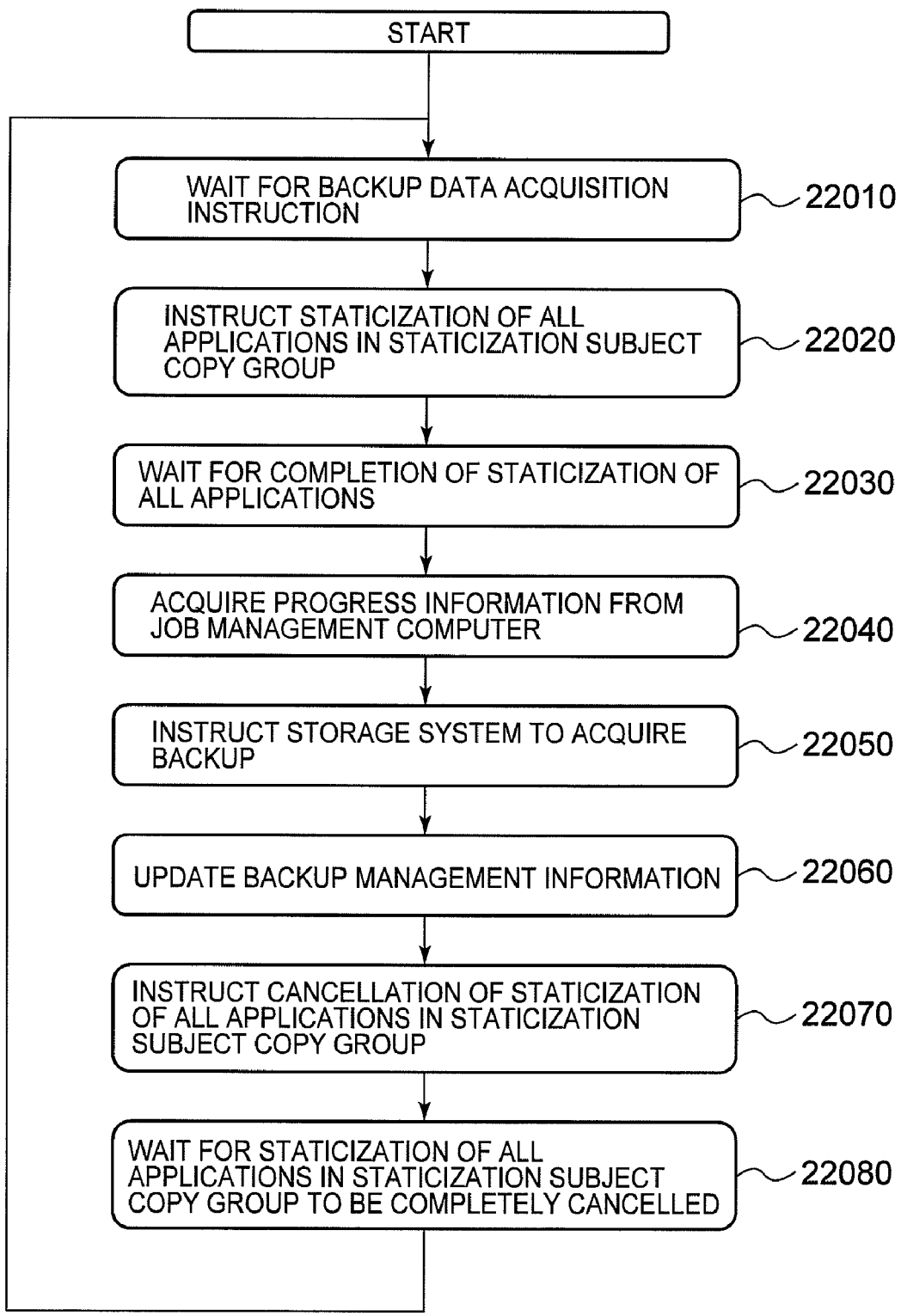
FIG. 22 is a view showing the processing flow of a backup instruction program in the third embodiment.

First, the flow of processing of the backup instruction program 1252' will be described using FIG. 22.

This processing begins when the user activates the backup instruction program 1252'.

When the processing begins, first the backup instruction program 1252' waits until a backup data acquisition instruction is generated (step 22010). The backup data acquisition instruction may be generated using a CLI provided by the backup instruction program 1252'. The user or job scheduler specifies a specific copy group 19013 as a parameter of the CLI.

Upon reception of the backup data acquisition instruction, the backup instruction program 1252' staticizes all of the applications 1161 belonging to the copy group 19013 specified in the parameter (step 22020). The staticization subject applications 1161 may be specified by referring to the copy group management table 19254. In this step, the backup instruction program 1252' communicates with the recovery manager 1162 and issues a staticization instruction relating to the applications 1161 to the recovery manager 1162. This communication is established using the AP management network address and a unique port number of the recovery manager 1162.

Next, the backup instruction program 1252' waits until staticization of all of the applications 1161 specified in the step 22020 is complete (step 22030).

Having confirmed that staticization of all of the applications 1161 is complete, the backup instruction program 1252' obtains the progress state of the workflow from the job management server 12561 (step 22040). The progress state is obtained in the following manner, for example. The backup instruction program 1252' transmits a progress state acquisition request specifying the corresponding workflow (workflow ID) to the job management server 12561. Having received the acquisition request, the job management server obtains the progress state value corresponding to the specified workflow by referring to the workflow management table 12563, and transmits this value to the backup instruction program 1252'.

Next, the backup instruction program 1252' issues a request to the control program 1028 to back up the data in the data volumes 1011 belonging to the copy group 19013 specified in the parameter (step 22050).

Next, the backup instruction program 1252' updates the backup management table 19256 (step 22060). Here, the backup instruction program 1252' sets the identifier of the backup subject copy group 19013 in the CG_ID 21001. Further, the backup instruction program 1252' obtains the current time from a timer, not shown in the diagram, and sets this in the acquisition time 21002. Further, the backup instruction program 1252' sets the workflow progress state value obtained in the step 22040 in the progress state 21001.

Next, the backup instruction program 1252' cancels staticization of all of the applications 1161 belonging to the copy group 19013 specified in the parameter (step 22070). In this step, similarly to the step 22020, the backup instruction program 1252' communicates with the recovery manager 1162 and issues a staticization cancellation instruction to the recovery manager 1162.

Next, the backup instruction program 1252' waits until staticization of all of the applications 1161 specified in the step 22070 is completely canceled (step 22080). Once complete cancellation of the staticization of all of the applications 1161 is confirmed, the processing of the backup instruction program 1252' returns to the step 7010.

The flow of processing of the backup instruction program 1252' was described above.

Figure 23:
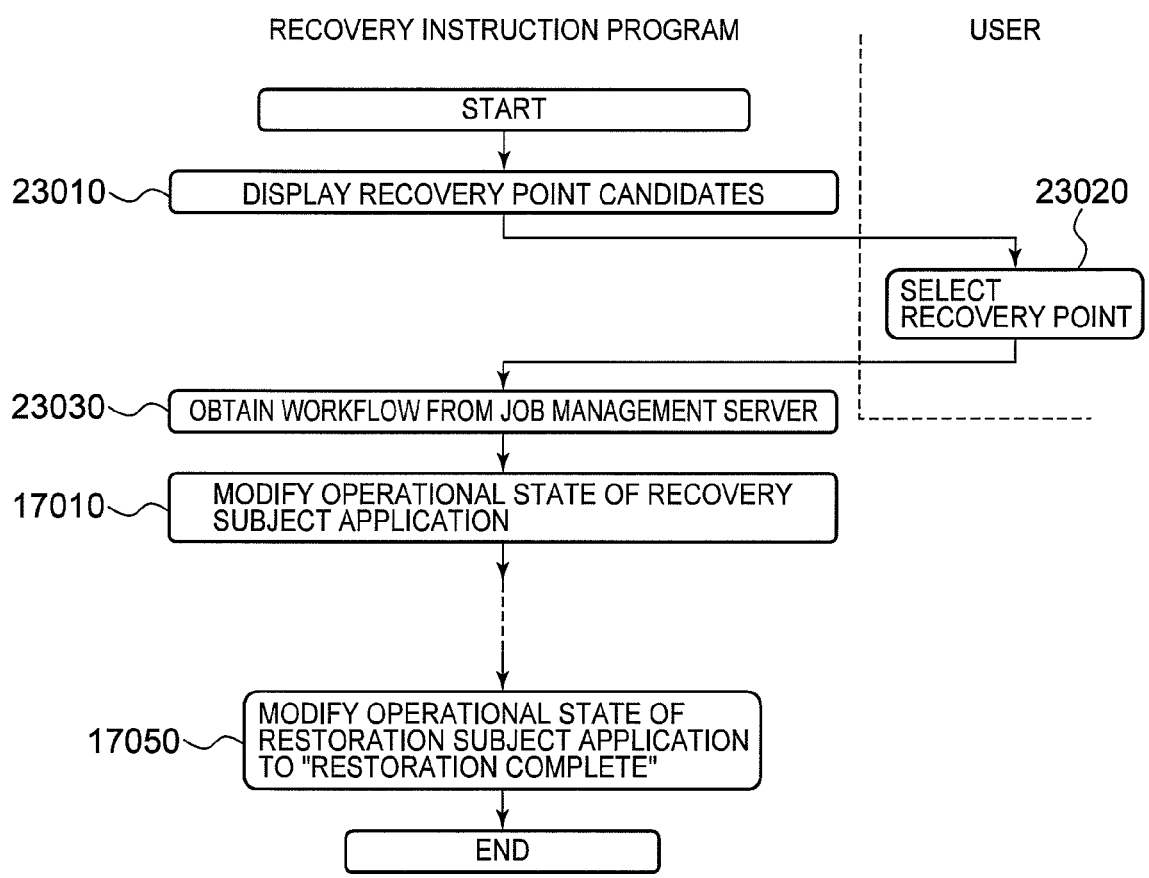
FIG. 23 is a view showing the processing flow of a recovery instruction program in the third embodiment.

Next, the flow of processing of the recovery instruction program 1253" upon reception of a recovery instruction will be described using FIG. 23. This processing begins when the user activates the recovery instruction program 1253", specifying a specific copy group 19013 as a parameter. Note that this processing is substantially identical to the processing described in the second embodiment using FIG. 17, and therefore the following description will focus mainly on differences.

When the user activates this processing, the recovery instruction program 1253" searches the backup management table 19256 for backup information relating to the copy group 19013 specified as the parameter, and provides the user with this information as recovery candidates (step 23010).

Next, the user selects a recovery point from the provided candidates (step 23020).

After receiving the recovery point, the recovery instruction program 1253" obtains the information in the workflow file from the job management server 12561 (step 23030).

Figure 17:
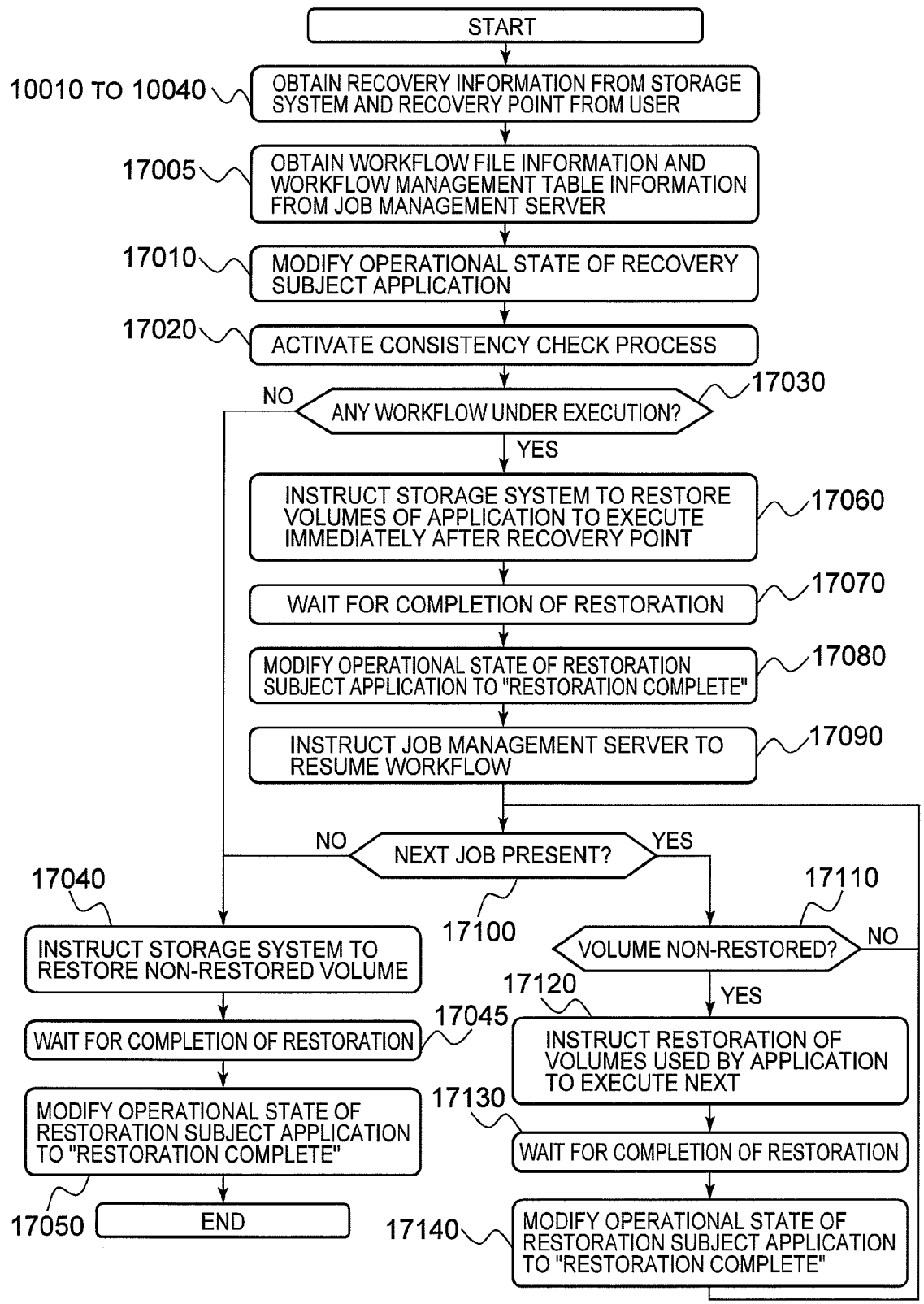
FIG. 17 is a view showing the flow of processing when a recovery instruction program of the second embodiment receives a recovery instruction.

Thereafter, the processing is substantially identical to the step 17010 to the step 17050 of the processing described in the second embodiment using FIG. 17, except for the following point. When setting the operational state information in the step 17010, the step 17050, and so on, and with respect to the referenced locations, the status 20004 of the copy group management table 19254 is used instead of the status 15004 of the JNLG management table 1254.

The flow of processing of the recovery instruction program 1253" upon reception of a recovery instruction was described above.

The third embodiment was described above. According to this embodiment, the applications 1161 that have to perform processing immediately after recovery are recovered earlier when recovering data that are backed up using a technique of backing up the data volumes 1011 of the plurality of applications 1161 collectively, and as a result, the time required to resume operations is shortened.

Several embodiments of the present invention were described above, but these embodiments are merely examples of the present invention, and the scope of the present invention is not limited to these embodiments alone. The present invention may be implemented in various other embodiments.

What is claimed is:

1. A control apparatus for controlling the recovery of data stored in a plurality of logical volumes constituting a volume group within a storage system having said plurality of logical volumes, comprising:
a priority determination unit for determining a priority of each of a plurality of applications that use said data in different logical volumes constituting said volume group;
a restoration instruction unit for issuing a restoration instruction to said storage system to execute restoration on said plurality of logical volumes constituting said volume group in sequence from a logical volume used by an application having a high priority;
wherein said restoration instruction unit issues said restoration instruction in logical volume units when restoring said data recorded in said volume group, and issues said storage system with a restoration instruction specifying a logical volume that is used by an application having a high priority prior to a restoration instruction specifying a logical volume that is used by an application having a lower priority than said application having a high priority;
a consistency check instruction unit for issuing a consistency check instruction to an application that uses said specified logical volume when restoration of said data to said specified logical volume is complete;
a consistency check time acquisition unit for acquiring, in relation to each of said plurality of applications, a time required to perform a consistency check on said data stored in said logical volumes used by said applications,
wherein said priority determination unit refers to said time required to perform said consistency check on each of said plurality of applications, acquired by said consistency check time acquisition unit, and determines said priority of each of said plurality of applications in sequence such that an application in which said time required to perform said consistency check is longest has the highest priority,
said restoration instruction unit issues said restoration instruction such that restoration is executed in sequence from said logical volume used by said application having the highest priority, and
said consistency check instruction unit issues said consistency check instruction such that said consistency check is performed in sequence from an application using a logical volume that has completed restoration.

2. The control apparatus according to claim 1, wherein said consistency check time acquisition unit estimates said time required to perform said consistency check on the basis of a classification of each of said plurality of applications.

3. The control apparatus according to claim 2, wherein, when at least two applications that are a DBMS, a journaling file system, or a file system other than a journaling file system are included in said plurality of applications, said consistency check time acquisition unit estimates said time required to perform said consistency check such that said estimated time required to perform said consistency check is longest for said file system other than a journaling file system, next longest for said DBMS, and shortest for said journaling file system.

4. The control apparatus according to claim 2, wherein, when said plurality of applications include a certain type of DBMS, said consistency check time acquisition unit acquires said time required to perform said consistency check on said certain type of DBMS from a tool known as an MTTR advisor.

5. The control apparatus according to claim 2, wherein, when said applications include a file system other than a journaling file system, said consistency check time acquisition unit estimates said time required to perform said consistency check on said file system other than a journaling file system from a past record value and a current file number.

6. The control apparatus according to claim 1, wherein said consistency check time acquisition unit acquires said time required to perform said consistency check on each of said plurality of applications periodically or irregularly from before the beginning of recovery, and
said storage system further comprises:
a snapshot volume, which is a logical volume storing a snapshot of each of said plurality of logical volumes, obtained at an arbitrary time;
a journal volume, which is a logical volume storing a journal that is obtained every time said data relating to said plurality of logical volumes are updated, as a record of the update content;
a sequence relationship management unit for managing information indicating a sequence relationship between each of said time required to perform said consistency check, said snapshot, and said journal at a point in time when said time required to perform said consistency check, said snapshot, and said journal are obtained;
a first storage area for storing consistency check time information including said time required to perform said consistency check on each of said plurality of applications, which is obtained periodically or irregularly by said consistency check time acquisition unit, and information indicating said sequence relationship, in association with each other;
a second storage area for storing information relating to said snapshots stored in said snapshot volume and information indicating said sequence relationship in association with each other; and
a third storage area for storing information relating to said journals stored in said journal volume and information indicating said sequence relationship in association with each other.

7. The control apparatus according to claim 6, wherein, when said consistency check time information corresponding to a specified time is stored in said first storage area, said consistency check time acquisition unit obtains said time required to perform said consistency check at said specified time from said consistency check time information corresponding to said specified time, and when said consistency check time information corresponding to said specified time is not stored in said first storage area, said consistency check time acquisition unit estimates said time required to perform said consistency check at said specified time on the basis of one or a plurality of pieces of said consistency check time information stored in said first storage area.

8. The control apparatus according to claim 7, wherein, when said consistency check time information corresponding to said specified time is not stored in said first storage area, said consistency check time acquisition unit obtains said consistency check time information immediately before said specified time and said consistency check time information immediately after said specified time from said first storage area, and estimates said time required to perform said consistency check at said specified time as an average value of said times required to perform said consistency check included in each of said pieces of information.

9. The control apparatus according to claim 7, further comprising a user interface unit for providing a user with a restorable time range, calculating a time required for recovery at a time specified by said user within said restorable range from said estimated value of said consistency check time at said specified time and a time required for restoration, and providing said user with said calculated time required for recovery.

10. A control apparatus for controlling the recovery of data stored in a plurality of logical volumes constituting a volume group within a storage system having said plurality of logical volumes, comprising:
 a priority determination unit for determining a priority of each of a plurality of applications that use said data in different logical volumes constituting said volume group;
 a restoration instruction unit for issuing a restoration instruction to said storage system to execute restoration on said plurality of logical volumes constituting said volume group in sequence from a logical volume used by an application having a high priority;
 wherein said restoration instruction unit issues said restoration instruction in logical volume units when restoring said data recorded in said volume group, and issues said storage system with a restoration instruction specifying a logical volume that is used by an application having a high priority prior to a restoration instruction specifying a logical volume that is used by an application having a lower priority than said application having a high priority;
 a consistency check time acquisition unit for acquiring, in relation to each of said plurality of applications, a time required to perform a consistency check on said data stored in said logical volumes used by each of said applications,
 wherein, when at least two applications, from among said plurality of applications, operate using each other's functions, said priority determination unit refers to said time required to perform said consistency check on each of said plurality of applications, acquired by said consistency check time acquisition unit, and determines said priority of each of said plurality of applications in sequence such that an application in which said time required to perform said consistency check is longest has the highest priority,
 when a plurality of jobs processed by each of said plurality of applications are executed in sequence, said priority determination unit determines said priority of each of said plurality of applications such that said priority increases steadily toward an application that processes a job to be executed earliest,
 said restoration instruction unit issues said restoration instruction such that restoration is executed in sequence from said logical volume used by said application having the highest priority, and
 a consistency check instruction unit issues a consistency check instruction such that a consistency check is performed in sequence from an application using a logical volume that has completed restoration.

* * * * *